(12) United States Patent
Hicks et al.

(10) Patent No.: US 7,086,001 B1
(45) Date of Patent: Aug. 1, 2006

(54) AUTOMATIC NETWORK DEVICE SELECTION AND DOCUMENT DELIVERY SYSTEM

(75) Inventors: Dennis W. Hicks, Eagle, ID (US); Richard Newman, Meridian, ID (US); Gary Johnson, Boise, ID (US); Lisa O'Toole, Eagle, ID (US); David Hay, Boise, ID (US); Chris Gyllenskog, Boise, ID (US); Steven C. Johnson, Eagle, ID (US); Matt Stephenson, Stratford, WI (US); Frank Hartmann, Boise, ID (US); Ray Asbury, Boise, ID (US); Eric Luttmann, Boise, ID (US)

(73) Assignee: OCÉ-USA, Inc., Chicago, IL (US)

(*) Notice: Subject to any disclaimer, the term of this patent is extended or adjusted under 35 U.S.C. 154(b) by 0 days.

(21) Appl. No.: 09/175,905

(22) Filed: Oct. 20, 1998

Related U.S. Application Data

(60) Provisional application No. 60/063,891, filed on Oct. 22, 1997.

(51) Int. Cl.
*G06F 15/00* (2006.01)
*G06F 17/00* (2006.01)

(52) U.S. Cl. .................. 715/523; 715/500.1; 358/1.15; 709/321

(58) Field of Classification Search ............... 707/500, 707/10; 358/1.15, 468; 709/201, 217–223, 709/321, 200; 715/500.1, 528, 523
See application file for complete search history.

(56) References Cited

U.S. PATENT DOCUMENTS

| | | | | |
|---|---|---|---|---|
| 5,220,674 A | * | 6/1993 | Morgan et al. | 709/223 |
| 5,602,974 A | * | 2/1997 | Shaw et al. | 358/1.15 |
| 5,737,599 A | * | 4/1998 | Rowe et al. | 707/10 |
| 5,848,415 A | * | 12/1998 | Guck | 707/10 |
| 5,881,213 A | * | 3/1999 | Shaw et al. | 358/1.15 |
| 5,911,776 A | * | 6/1999 | Guck | 709/217 |
| 5,943,680 A | * | 8/1999 | Shimizu et al. | 715/528 |
| 6,003,065 A | * | 12/1999 | Yan et al. | 709/201 |
| 6,148,346 A | * | 11/2000 | Hanson | 719/321 |
| 6,173,295 B1 | * | 1/2001 | Goertz et al. | 707/505 |
| 6,213,652 B1 | * | 4/2001 | Suzuki et al. | 358/1.15 |
| 6,252,681 B1 | * | 6/2001 | Gusmano et al. | 358/468 |

OTHER PUBLICATIONS

Gujar, Uday G., A device independent computer plotting system, ACM symposium on Graphic languages, 1976, pp. 85-100.*

\* cited by examiner

*Primary Examiner*—William Bashore
(74) *Attorney, Agent, or Firm*—Birch, Stewart, Kolasch & Birch, LLP

(57) ABSTRACT

A system of networked computers and peripherals and document delivery software which provides a user with a familiar simple user interface to deliver documents to a variety of different destinations. Each document generation device participating in the system is provided with a unified print driver which translates an electronic document into a non-specific or printer independent printer language file and appends to this file a job ticket containing any other rendering characteristics which may not be supported by the printer independent language. This entire file is then transmitted to the system server which analyzes the file, including the rendering characteristics; determines the best output device(s); appends output device specific commands to the general printer language file; and transmits this file to the device(s) for final output.

92 Claims, 81 Drawing Sheets

Microfiche Appendix Included
(17 Microfiche, 4600 Pages)

life-cycle    PrintGate: (
              ( startup . #device_log_record ) .
              ( Production~ || Operation* || ResourceDelivery~ ) .
              ( shutdown . #device_log_record )
              )*

Production    =    submit_job .
                   ( #needs_attention . #job_log_record )* .
                   ( #needs_resource . #job_log_record )* .
                   ( #proof . #job_log_record )* .
                   ( #product . #receipt . #job_log_record . #task_log_record+ )

Operation     =    Administration | ControlPrintGate

ResourceDelivery    =    ( deliver_resource | deliver_resource_unavailable ) .
                         #resource_log_record Administration      =    DeviceMgmt | PortMgmt
                         ControlPrintGate    =    ( enter_job_password .
              #job_log_record ) |
                         ( generate_encryption_key_pair . #generate_key_log_record ) |
                         JobMgmt |
                         TaskMgmt |
                         ProfileMgmt |
                         WorkQuery DeviceMgmt    =    (
                   (
                     add_device |
                     move_device |
                     copy_device |
                     change_device |
                     remove_device |
                     hold_device |
                     release_device |
                     ( query_device_configuration . #display_device_configuration )
                   ) .
                   #device_log_record
                   ) |
                   WorkQuery

FIG.11

```
PortMgmt    =      (
                add_port |
                change_port |
                delete_port |
                hold_port |
                release_port |
                ( query_port . #port_properties )
                ) .
                #port_log_record JobMgmt     =      (
                change_job_information |
                delete_job |
                ( view_job_document . #document_view) |
                ( query_job_information . #job_information )
                ) .
                #job_log_record TaskMgmt    =      ( add_task |
                change_task |
                cancel_task |
                hold_task |
                release_task |
                ( query_task . #display_task_properties ) ) .
                #task_log_record ProfileMgmt =      (
                create_profile |
                change_profile |
                delete_profile |
                ( query_profile . #display_profile_properties )
                ) .
                #profile_log_record WorkQuery   =      ( query_device_status . #display_device_status .
device_log_record )
```

FIG.12

Operation Schema Listings

Operation Schema: Add Device

Operation:     add_device

Description: Adds a new device to the PrintGate system.

---

Reads:          supplied name: device_name,
                supplied privilege
                supplied new_parent : device_name
                parent_id: new_parent.id Changes:     new new_device : device,
                new new_link : is_child_of Sends:          activity_log:{device_log_record}

Assumes:

Result:         If privilege allows, and
                if new_parent.type is not atomic, and
                if new_device.type will not be 'system'
                then
                        new_device.name has been initialized to device_name.
                        new_device.id has been set to default value.
                        new_device.characteristics and new_device.priority have been
                set to default values,
                        new_link.parent has been set to new_parent.id,

FIG.13 new_link.child has been set to new_device.id.

device_log_record has been sent to the activity_log

FIG.14

Operation Schema: Add Port

Operation: add_port

Description: Operator adds a Data Port to the system.

---

Reads:  supplied port_name,
supplied port_configuration,
supplied privileges.

Changes: new Data_Port

Sends:  Activity Log:{port_log_record}

Assumes:

Result: If port_name does not refer to any existing ports, and privileges allows this operation then,
A new Data_Port has been added to the system.
Data_Port.name has been set to port_name.
Data_Port.configuration has been set to port_configuration.
Data_Port.held has been cleared.

port_log_record has been sent to the Activity Log

FIG.15

Operation Schema: Add Task

Operation:     add_task

Description: Adds a new task for a job on to the system device.

---

Reads:         supplied task_instructions,
     supplied job_id,
     supplied privileges,
     job with job.id = job_id.

Changes:   new task,
     device with device.type = "system".

Sends:         activity_log: {task_log_record}

Assumes:

Result:        If privileges allow this operation and
     job_id identifies a job with job.id = job_id then
         A new Task has been added to the system Device,
         Task.job_id has been set to job_id,
         Task.instructions have been set to task_instructions.

task_log_record has been sent to the activity_log.

FIG.16

Operation Schema: Cancel Task

Operation: cancel_task

Description: Removes a job's task from the system

---

Reads:       supplied task_id
                supplied privileges

Changes:   delete Task with task.id = task_id
                device with device_id = task.device_id Sends:       activity log: {task_log_record}

Assumes:

Result:      If privileges allows this operation then
                task has been removed from device.

task_log_record has been sent to the activity log.

FIG.17

Operation Schema: Change Device

Operation: change_device

Description: Changes a device's name, characteristics and priority.

---

Reads:           supplied old_name : device_name supplied new_name: device_name, supplied new_characteristics : characteristics, supplied new_priority : priority, supplied privilege supplied dev_id : device_id Changes:   changed_device : device with device.name=old_name and device.id=dev_id Sends:           activity_log:{device_log_record}

Assumes:

Result:          If privilege allows and if changed_device.hold is set, then changed_device.name has been set to new_name.

changed_device.characteristics has been set to new_characteristics.

changed_device.priority has been set to new_priority.

device_log_record has been sent to the activity_log

FIG.18

Operation Schema: Change Job Information

Operation: change_job_information

Description: Operator changes customer and billing information for a given job.

---

Reads: supplied job_identification,
supplied new_billing_information,
supplied new_customer_information
supplied privileges.

Changes: Job with Job_id = job_identification

Sends: Activity Log: {job_record(s)}

Assumes: The new billing and customer information is valid.

Result: If privileges allows operation then,
Job.billing_information has been set to new_billing_information.
Job.customer_information bas been set to new_customer_information.

job_record(s) has been sent to the Activity Log.

FIG.19

Operation Schema: Change Port

Operation: change_port

Description: Operator changes the configuration of a Data Port

Reads: supplied old_port_name,
supplied new_port_name,
supplied new_configuration,
supplied privileges.

Changes: Initial Data_Port with Data_Port.name = old_port_name.

Sends: Activity Log:{port_log_record}

Assumes:

Result: If new_port_name does not refer to any existing ports, privileges allows operation, and
Data_Port.held is set then,
Final Data_Port.name has been set to new_port_name.
Final Data_Port.configuration has been set to new_configuration.

port_log_record has been sent to the Activity Log

FIG.20

Operation Schema: Change Profile

Operation: change_profile

Description: Changes the attributes of an existing customer/user profile.

---

Reads: supplied old_name,
    supplied new_name,
    supplied capabilities,
    supplied new_default_job_ticket,
    supplied privileges.

Changes: profile with profile.name = old_name

Sends: activity_log: {profile_log_record}

Assumes:

Result: If new_name does not refer to any existing profile.name and privileges allows
    this operation then
        Profile.name is set to new_name,
        Profile.capabilities is set to new_capabilities,
        Profile.default_job_ticket is set to new_default_job_ticket.

profile_log_record has been sent to the activity_log.

FIG.21

Operation Schema: Change Task

Operation: change_task

Description: Changes a task's attributes or device assignment

Reads: supplied task_id,
supplied new_instructions,
supplied privileges.

Changes: Task with Task.id = task_id,
original_device: *Initial* device with device.id = task.device_id,
system_device: device with device.type = "system".

Sends: activity_log: {task_log_record}

Assumes:

Result: If privileges allows this operation then
Task.instructions has been set to new_instructions.
Task.hold_status has been set on. *
If *Final* Task.instructions can not be performed on
original_device then
Task has been removed from original_device,

FIG.22

Task has been assigned to system_device.

task_log_record has been sent to the activity_log.

* Note: this means that task will need to be released later.

FIG.23

Operation Schema: Copy Device

Operation: copy_device

Description: Copies a device to a different pool.

Reads:
supplied new_parent : device_id
supplied child_id : device_id
supplied privilege
parent : device with device.id = new_parent
child : device with device.id = child_id Changes: new new_link : is_child_of Sends: activity_log:{device_log_record}

Assumes:

Result:
If privilege allows, and
if child has not become an ancestor of child, and
if parent.type is not atomic, and
if child.type is not system,
then
new_link.parent has been set to new_parent and
new_link.child has been set to child_id.

FIG.24 device_log_record has been sent to the activity_log

FIG.25

Operation Schema: Create Profile

Operation: create_profile

Description: Adds a new customer/user profile to the system.

---

Reads: supplied name,
supplied privileges.

Changes: new profile

Sends: activity_log: {profile_log_record}

Assumes:

Result: If name does not refer to any existing profile.name and privileges allows this operation then A new profile has been added to the system, Profile.name has been set to name, Profile.capabilities has been set to profile.capabilities from profile with profile with profile.name = "Default".

profile_log_record has been sent to the activity_log.

FIG.26

Operation Schema: Delete Job

Operation:     delete_job

Description: Operator deletes a Job and all of its associated Tasks from the system.

---

Reads:         supplied job_identification,
               supplied privileges.

Changes:       delete Job with Job.id = job_identification,
               delete all Tasks with Task.job_id = job_identification,
               for each Task above,
               Device with Device.id = Task.device_id.

Sends:         Activity Log: {job_log_record}

Assumes:

Result:        If privileges allows operation then,
               Job has been removed from system.
               All Tasks associated with Job have been removed from their respective
               devices.

job_log_record has been sent to Activity Log.

FIG.27

Operation Schema: Delete Port

Operation: delete_port

Description: Operator removes a Data Port from the system.

---

Reads: supplied port_name, supplied privileges.

Changes: delete Data_Port with Data_Port.name = port_name.

Sends: Activity Log:{port_log_record}

Assumes:

Result: If privileges allows the operation, and Data_Port.held is set
then,

The Data_Port with Data_Port.name = port_name has been removed from the system.

port_log_record has been sent to the Activity Log.

FIG.28

Operation Schema: Delete Profile

Operation: delete_profile

Description: Remove an existing customer/user profile from the system.

Reads: supplied name,
supplied privileges.

Changes: delete profile with profile.name = name.

Sends: activity_log: {profile_log_record}

Assumes:

Result: If privileges allows this operation then
named profile is removed from the system.

profile_log_record has been sent to the activity_log.

FIG.29

Operation Schema: Deliver Resource

Operation: deliver_resource

Description: Resource Library delivers a Resource to a Device that is processing a Task.

---

Reads: supplied device_name,
supplied resource_name,
supplied resource_type,
supplied resource_data.

Changes: Device with Device.name = device_name.

Sends: Activity Log:{job_log_record}

Assumes:

Result: If Device.processes.resource_name is resource_name,
Device.processes.resource_type is resource_type, and
Device.processes.resource_data is NULL then,
Device.processes.resource_data has been set to
resource_data.

job_log_record has been sent to the Activity Log.

FIG.30

Operation Schema: Deliver Resource Unavailable

Operation: deliver_resource_unavailable

Description: Resource Library indicates that a Resource needed by a Device that is processing a Task
        cannot be delivered.

---

Reads:       supplied device_name,
              supplied resource_name,
              supplied resource_type,
              Device with Device.name = device_name.

Changes:   Task with Taks.id = Device.task_id.

Sends:       Activity Log:{job_log_record}
              Operator:{attention_required}

Assumes:

Result:      If Device.processes.resource_name is set to resource_name,
              Device.processes.resource_type is set to resource_type, and
              Device.processes.resource_data is set to NULL then,
                    Task.held has been set.
                    Task.intervention_required has been set.
                    attention_required has been sent to the Operator.

job_log_record has been sent to the Activity Log

FIG.31

Operation Schema: Enter Job Password

Operation: enter_job_password

Description: Operator enters password to allow Job to be processed.

---

Reads: supplied job_identification,
supplied password,
supplied privileges.

Changes: Job with Job.id = job_identification

Sends: Activity Log: {job_log_record}

Assumes:

Result: If operator_privileges allows operation, and
Job.password_required is set, and
Job.password is set to password then,
Job.password_required is cleared.

job_log_record has been sent to Activity Log.

FIG.32

Operation Schema: Generate Encryption Key Pair

Operation: generate_encryption_key_pair

Description: Operator generates a encryption/decryption key pair for job encryption.

---

Reads: supplied privileges,
supplied profile_name.

Changes: Profile with Profile.name = profile_name

Sends: Operator: {public_decryption_key},
Activity Log: {profile_log_record}.

Assumes:

Result: If privileges allows the operation then,
A encryption/decryption key pair has been generatred.
Profile.encryption_key has been set to the encryption key.
Profile.decryption_key has been set to the decryption key.
The decryption key has been sent to the Operator.

profile_log_record has been sent to the Activity Log

FIG.33

Operation Schema: Hold Device

Operation:       hold_device

Description: Pauses a device's execution

---

Reads:           supplied dev_id: device_id supplied privilege

Changes:    held_device : device with device.id equal to dev_id

Sends:           activity_log:{device_log_record}

Assumes:

Result:          If privilege allows, and device.hold_status for held_device is
cleared, then The device.hold_status for held_device has been set.

device_log_record has been sent to the activity_log

FIG.34

Operation Schema: Hold Port

Operation: hold_port

Description: Operator holds a Data Port to prevent Job submission.

---

Reads: supplied port_name,
supplied privileges.

Changes: Data_Port with Data_Port.name = port_name.

Sends: Activity Log:{port_log_record}

Assumes:

Result: If Data_Port.held is not set, and privileges allows operation
then,

Data_Port.held has been set.

port_log_record has been sent to the Activity Log.

FIG.35

Operation Schema: Hold Task

Operation: hold_task

Description: Places a task on hold so that it will not continue to be processed.

---

Reads: supplied task_id,
supplied privileges.

Changes: task with task.id = task_id

Sends: activity_log: {task_log_record}

Assumes:

Result: If privileges allows this operation and
if *Initial* task.hold_status is cleared then
*Final* task.hold_status has been set.

task_log_record has been sent to the activity_log.

FIG.36

Operation Schema: Move Device

Operation:     move_device

Description: Moves a device to a different pool.

---

Reads:         supplied old_parent : device_id
               supplied new_parent : device_id
               supplied child_id : device_id
               supplied privilege
               parent : device with device.id = new_parent
               child : device with device.id = child_id Changes:       new new_link : is_child_of
               delete old_link : is_child_of with is_child_of.parent = old_parent and
               is_child_of.child = child_id Sends:         activity_log:{device_log_record}

Assumes:

Result:        If privilege allows, and
               if child has not become an ancestor of child, and
               if new_parent.type is not atomic, and
               if child.type is not system, and
               if child.hold is set,
               then
                   old_link has been removed and

FIG.37 new_link.parent has been set to new_parent and
new_link.child has been set to child_id.

device_log_record has been sent to the activity_log

FIG.38

Operation Schema: Query Device Configuration

Operation: query_device_configuration

Description: Reports the current configuration and properties of a device

Reads: supplied device_name,
supplied privileges,
device with device.name = device_name.

Changes:

Sends: operator: {device_properties}
activity_log: {device_log_record}

Assumes:

Result: If privileges allow this operation then
device_properties sent to operator.

device_log_record has been sent to the activity_log.

FIG.39

Operation Schema: Query Device Status

Operation: query_device_status

Description: Reports the current processing status of a system device

Reads:  supplied device_name,
 supplied privileges,
 device with device.name = device_name.

Changes:

Sends:  operator: {device_status}
 activity_log: {device_log_record}

Assumes:

Result:  If privileges allow this operation then
 device_status sent to operator.

device_log_record has been sent to the activity_log.

FIG.40

Operation Schema: Query Job Information

Operation:    query_job_information

Description: Reports the current job-level properties of a job

Reads:        supplied job_id,
              supplied privileges,
              job with job.id = job_id.

Changes:

Sends:        operator: {job_information}
              activity_log: {job_log_record}

Assumes:

Result:       If privileges allow this operation then
              job_information sent to operator.

job_log_record has been sent to the activity_log.

FIG.41

Operation Schema: Query Port

Operation: query_port

Description: Reports the current properties and status of a data port

Reads: supplied port_name,
supplied privileges,
port with port.name = port_name.

Changes:

Sends: operator: {port_properties, port_status}
activity_log: {port_log_record}

Assumes:

Result: If privileges allow this operation then
port_properties and port_status sent to operator.

port_log_record has been sent to the activity_log.

FIG.42

Operation Schema: Query Profile

Operation:     query_profile

Description: Reports the current properties of a profile

Reads:          supplied profile_name,
                supplied privileges,
                profile with profile.name = profile_name.

Changes:

Sends:          operator: {profile_properties}
                activity_log: {profile_log_record}

Assumes:

Result:         If privileges allow this operation then
                profile_properties sent to operator.

profile_log_record has been sent to the activity_log.

FIG.43

Operation Schema: Query Task

Operation:     query_task

Description: Reports the current properties and status of a task

Reads:         supplied task_id,
               supplied privileges,
               Task with Task.id = task_id.

Changes:

Sends:         Operator: {task_properties, task_status}
               activity_log: {task_log_record}

Assumes:

Result:
               If privileges allow this operation then
                   task_properties and task_status sent to Operator.

task_log_record has been sent to activity_log.

FIG.44

Operation Schema: Release Device

Operation: release_device

Description: Resumes a device's execution after it has been paused.

---

Reads: supplied dev_id: device_id,
supplied privilege

Changes: released_device : device with device.id equal to device_id

Sends: activity_log:{device_log_record}

Assumes:

Result: If privilege allows, and device.hold for released_device is set,
then
The device.hold for released_device has been cleared.

device_log_record has been sent to the activity_log

FIG.45

Operation Schema: Release Port

Operation: release_port

Description: Operator releases a Data Port to allow Job submission;

Reads: supplied port_name,
supplied privileges.

Changes: Data_Port with Data_Port.name = port_name.

Sends: Activity Log:{port_log_record}

Assumes:

Result: If privileges allows operation then,
Data_Port.status has been set to Ready.

port_log_record has been sent to the Activity Log

FIG.46

Operation Schema: Release Task

Operation:     release_task

Description: Resumes a task's operation so that it will continue to be processed.

---

Reads:         supplied task_id,
               supplied privileges.

Changes:       task with task.id = task_id

Sends:         activity_log: {task_log_record}

Assumes:

Result:        If privileges allows this operation and
               if *Initial* task.hold_status is set on then
                   *Final* task.hold_status has been cleared.

task_log_record has been sent to the activity_log.

FIG.47

Operation Schema: Remove Device

Operation:   remove_device

Description: Removes a device from a pool. If it is the only instance of that device in the system, the device is removed from the PrintGate system.

---

Reads:   supplied dev_id: device_id,
   supplied privilege
   supplied parent_id : device_id Changes:   delete link: is_child_of with is_child_of.child = dev_id and is_child_of.parent = parent_id
   delete last_device : device with device.id = dev_id Sends:   activity_log:{device_log_record}

Assumes:

Result:   If privilege allows and
   if last_device.hold is set, then
      link has been removed and
   If no other is_child_of with is_child_of.child = dev_id then
      last_device has been removed.
   Otherwise, last_device has not been removed.

device_log_record has been sent to the activity_log

FIG.48

Operation Schema: Shutdown

Operation: shutdown

Description: Shuts down the PrintGate system.

---

Reads: supplied privilege

Changes: system_device : device with device.type equal to 'system'
all_devices : all devices in the system which have device.hold cleared Sends:

Assumes:

Result: If privilege allows, and
if device.availability for system_device has been set then
system_device has had device.availability cleared
all_devices has had device.hold set device_log_record has been sent to the activity_log.

FIG.49

Operation Schema: Startup

Operation:     startup

Description:   Starts the PrintGate system.

---

Reads:         supplied privilege

Changes:       system_device : device with device.type equal to 'system'
               all_devices : all devices in the system which have device.hold set Sends:         activity_log: {device_log_record}

Assumes:

Result:        If privilege allows, and
               if device.availability for system_device has not been set then
               system_device has had device.availability set.
               all_devices has had device.hold cleared
               Otherwise, no change occurs.

device_log_record has been sent to the activity_log.

FIG.50

Operation Schema: Submit Job

Operation: submit_job

Description: Data Source adds a Job to the system.

Reads: supplied port_name,
supplied originator,
supplied job_ticket,
supplied document_data,
Data_Port with Data_Port.name = port_name,
Profile with Profile.name = originator,
Profile with Profile.name = port_name,
Profile with Profile.name = "Default".

Changes: new Job.

Sends: Product: {proof,product,receipt},
Operator:{processing_job, completed_job, needs_attention},
Resource Library:{resource_request},
Activity Log:{job_log_record(s)}.

Assumes: document_data is in a supported PDL.

Result: If Data_Port.held is cleared then,
A new job has been added to the system.
Job.instructions, Job.customer_information and
Job.billing_information

FIG.51 have been set based on the job_ticket.

Job.document.data has been set to document_data.

Job.originator has been set to originator.

If Profile with Profile.name = Job.originator exists then,

If Job.is_encrypted is set,

Job.instructions, Job.customer_information,

Job.billing_information and Job.document_data has been decrypted using Profile.decryption_key from Profile with Profile.name Job.originator.

Job.instructions, Job.customer_information and

Job.billing_information has been merged with

Profile.default_instructions,

Profile.default_customer_information and

Profile.default_billing_information respectively form Profile with

Profile.name = Job.originator.

Job.priority has been set to Profile.default_priority from Profile with

Profile.name = Job.originator.

Otherwise if Profile with Profile.name = Job.port exists then,

If Job.is_encrypted is set,

Job.instructions, Job.customer_information,

Job.billing_information and Job.document_data has     been decrypted using

Profile.decryption_key from Profile with Profile.name = Job.port.

Job.instructions, Job.customer_information and

Job.billing_information has been merged with

Profile.default_instructions.

Operation Schema: Submit Job (Continued)

FIG.52

Profile.default_customer_information and

Profile.default_billing_information respectively from Profile with Profile.name

=

Job.port.

Job.priority has been set to Profile.default_priority from Profile with

Profile.name = Job.port.

Otherwise,

If Job.is_encrypted is set,

Job.instructions, Job.customer_information,

Job.billing_information and Job.document_data has been decrypted using

Profile.decryption_key from Profile with Profile.name = "Default".

Job.instructions, Job.customer_information and

Job.billing_information has been merged with

Profile.default_instructions,

Profile.default_customer_information and

Profile.default_billing_information respectively from Profile with Profile.name = "Default".

Job.priority has been set to Profile.default_priority from Profile with

Profile.name = "Default".

job_log_record(s) has been sent to the Activity Log.

processing_job indicator (i.e. lights) has been signaled to the Operator.

If operator attention was required then, needs_intervention indicator (i.e. lights) has been signaled to the Operator.

If external resources were required then, resource_request has been sent to the Resource Library.

Job.status has been set to Done.

FIG.53 completed_job indicator (i.e. lights) has been signaled to the Operator.

If Job.instructions indicate that a proof was required then,

A proof has been generated.

The product has been generated.

A receipt has been generated.

Otherwise,

There was no effect on the system.

FIG.54

Operation Schema: View Job Document

Operation: view_job_document

Description: Operator views a representation of the document data of a Job.

Reads: supplied job_identification,
supplied privileges,
Job with Job.id = job_identification.

Changes:

Sends: Operator: {document_representation},
Activity Log: {job_log_record}.

Assumes:

Result: If the privileges allows the operation then,
Job.document_data has been converted into a viewable format.
The viewable data has been presented to the Operator.

job_log_record has been sent to the Activity Log

FIG.55

Life-Cycle Model Notation

| life cycle [*Name* :] *Regular_Expression*<br>      (*LocalName* = *Regular_Expression*)* |  |  |
|---|---|---|
| *Regular_Expressions:*<br>event | Name | Any event name (operation) ,. Local name, or output |
|  | Concatenation | $x.y$ |
|  | Alternation | $x|y$ |
|  | Repetition |  |
|  |     Zero or more | $x^*$ |
|  |     One or more | $x^+$ |
|  | Optional | $[x]$ |
|  | Interleaving | $\|$ |
|  | Grouping | $(x)$ |

Operation Model Notation

| Operation: | operation identifier |
|---|---|
| Description: | \<text\> Description of operation |
| Reads: | \<supplied values\> \<state components\> |
| Changes: | \<supplied values\> \<state components\> |
| Sends: | \<agent communication\> \<state components\> |
| Assumes: | \<assertions\> (preconditions) |
| Result: | \<assertions\> (preconditions) |

FIG.57

Class Description Notation:

```
class <ClassName> [isa < SuperClassNames>]
    // for each attribute
    [attribute] [mutability]<a_name> :[sharing][Binding}<Type>
        .
        .
        .
    // for each method
    [method] <m_name> <arglist>[:<Type>]
        .
        .
        .
endclass
```

FIG.60

Figure 69:
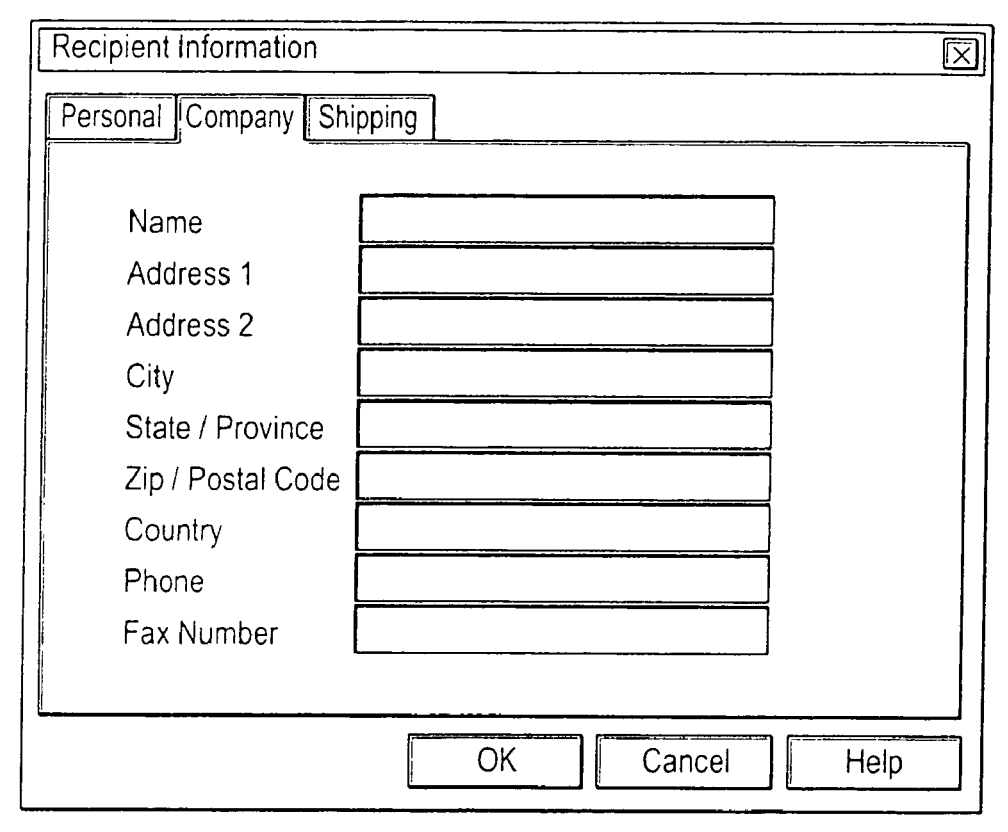

FIG.69

AUTOMATIC NETWORK DEVICE SELECTION AND DOCUMENT DELIVERY SYSTEM

RELATED APPLICATIONS

This application claims the priority of Provisional Application Ser. No. 60/063,891 filed Oct. 22, 1997.

BACKGROUND OF THE INVENTION

1. Technical Field

This invention generally relates to document handling on a computer network, and more particularly, this invention relates to a recipient based system for printing, faxing, storing and transmitting electronic documents across networks.

2. Background

Modern business requires that computing environments become more flexible, easy to use, allow for growth, and in particular, be measurable cost effective. A fundamental element of computing environments is the handling of documents. The concept of a "document" is now much more than just a printed piece of paper. A document can be printed in both black and white color, it can be viewed electronically, it can be archived on removable or fixed storage media, and it can be transmitted electronically. Unfortunately, the traditional mechanisms for delivering documents consist of independent solutions. This problem is characteristic of the current device based paradigm for document delivery. It would therefor be desirable to provide a single integrated solution which allows a network user to deliver his or her document to one or more different destinations or recipients in a single step regardless of the end form in which the document is presented.

SUMMARY OF THE INVENTION

According to the present invention, this general end is achieved by a system of networked computers, peripherals and document delivery software which provides the user with a familiar simple user interface, such as a print dialog box in a Windows® environment, to deliver documents to a variety of different destinations, both within the network, across networks and outside of the network via remote links.

In one embodiment of the invention, a document generation device participating in the system, whether directly connected to the network or interacting full or part time through a remote link, may be provided with a print driver which translates an electronic document into a non-specific, or printer independent, printer language file and appends to this file a job ticket containing any other rendering characteristics which may not be supported by the printer independent language. Rendering characteristics include such things as color or monochrome output, duplex printing, number of original copies, stapling, collating, binding, recipient and destination information, etc. This entire file is then transmitted to the system server which analyzes the file, including the rendering characteristics; determines the best output device(s); appends output device specific commands to the general printer language file; and transmits this file to the device(s).

The job ticket and related flexibility of the software also enable recipient based delivery and result based delivery, both of which represent a paradigm shift away from device based printing. Recipient based delivery focuses upon the location of a particular recipient and the medium through which that recipient prefers to receive information, as opposed to a particular printer in the general location of the recipient. Result based delivery focuses on the presentation and medium for delivery of information, as opposed to a particular device or device location.

In one embodiment of the invention, the software on the server assigns an affinity value to each print job based upon the job size, destination and rendering characteristics. This affinity value is then used to determine which output device(s) will receive the document. The server must therefor be aware of what output devices are participating in the system, where they are located, what their specific characteristics are and whether or not any particular device is currently available. This information may be gathered automatically by having the server poll for network resources, the information may be manually entered by a user or system administrator, or the information may be input by a combination of the two methods. The user may elect to bypass the invention by selecting a specific printer driver rather than that of the invention. In this case, the invention software on the server simply forwards the print job on to the specific printer requested.

This system facilitates the ability to implement many other valuable and desirable features. One such feature is the ability to distribute a large job over two or more output devices participating in the system, essentially defining multiple output devices as a single output device. This is most advantageous where a single job contains multiple original copies and each output device receives one or more entire copies to output, thereby decreasing output time by a factor of the number of output devices and not causing the user to collate pages from multiple output devices. Additionally, the invention can distribute jobs over the output resources on the network to even distribute the workload.

Another feature which may be implemented is an activity log or journal which can provide detailed information concerning usage. The log can provide such information as the size and number of print jobs requested by any combination of users for billing purposes; job completion verification; diagnostic information to allow an operator to determine when and why jobs failed; and resource utilization information such as toner usage for a printer to plan for inventory, expenses and maintenance. The journal may be kept in a standard database format which may be easily imported to accounting, database or other computer applications.

The invention can support virtually any output device such as: standard image forming devices including printers, plotters, and video; facsimile devices; email communications; data communications links; and archival devices. In the case of hard copy image forming devices such as a laser printer, both banner and receipt pages can be generated. Banner pages can be used to identify sets of jobs on each printer and notify the operator of any finishing operations to be performed. Receipt pages can be used to provide a short job summary and verify job completion. Supported data communications can include serial telecommunications via data modems, network communications using TCP/IP, Net-BEUI, IPX/SPX and ETHERTALK. Supported storage devices for archival purposes as well as job submission, include floppy diskettes, IOMEGA JAZ drives and SYQUEST SYJET drives.

Advantageously, archival and storage of documents may be done in a platform independent format such as ADOBE's Portable Document Format (PDF). PDF allows a user of virtually any operating system to view and print archived documents using a freely distributed viewing program, ADOBE ACROBAT READER.

In another embodiment of the invention, the software on the server can be configured so that a job sent to a specific port or by a particular type of printer driver is always output the same way or according to a specific set of rules. This enables document generation devices to use a standard printer specific printer driver, such as a HEWLETT PACKARD LASERJET driver, and still have the job output to one or more different devices.

Additional advantages and novel features of the invention will be set forth in part in the description that follows, in the attached appendix and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 11 and 12 describe the general life cycle model and rely on the schemata of FIGS. 13 through 55;

FIG. 57 describes the Life Cycle Model notation used in FIGS. 11 and 12;

FIGS. 58 through 61 describe various notation schemes used in FIGS. 62 through 66;

FIGS. 67 through 81 illustrate one possible graphical user interface for the job ticket and show some of the various delivery options.

DETAILED DESCRIPTION OF THE INVENTION

Figure 3:
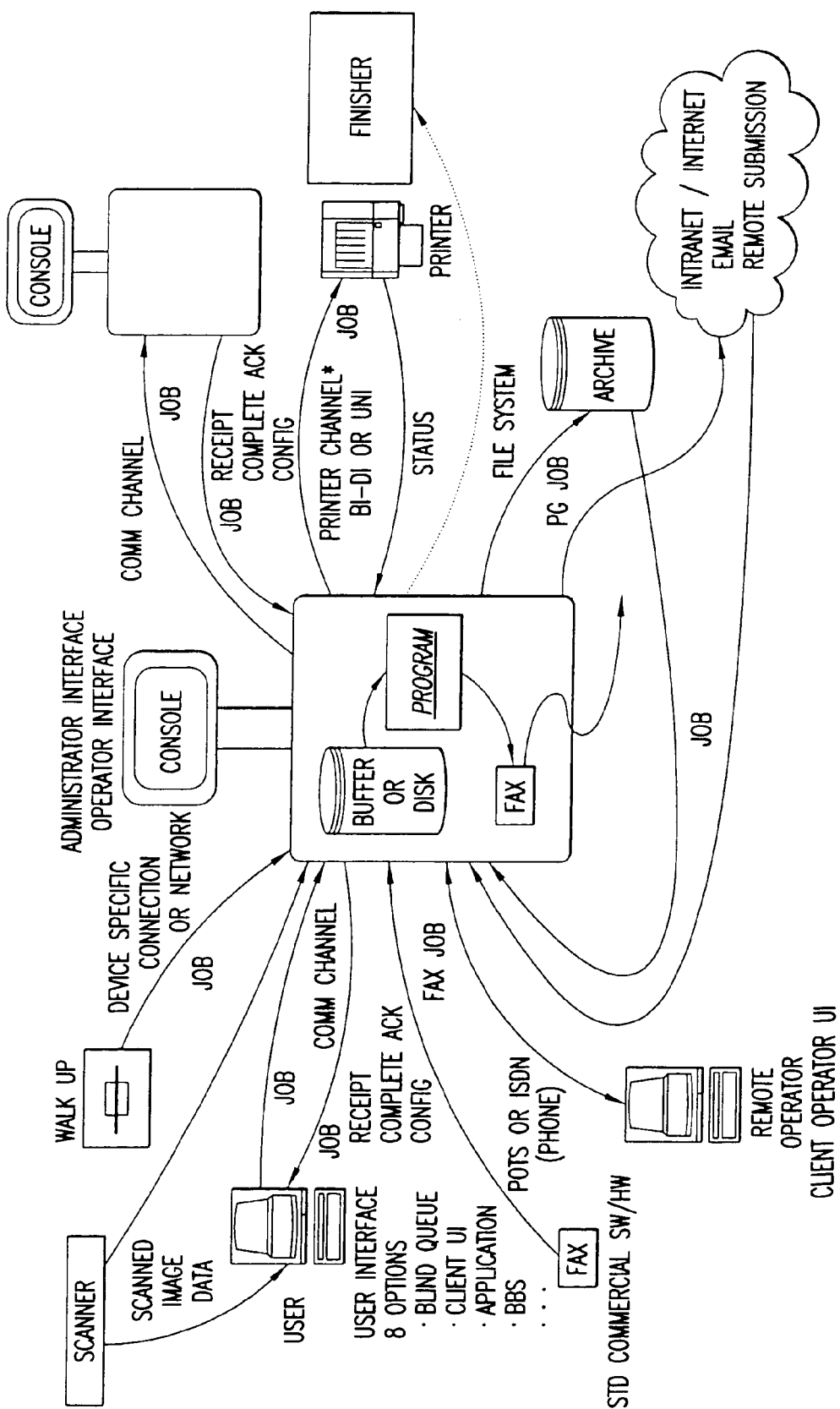
FIG. 3 is a graphic representation of the connections that may be made to a representative hardware system.

Referring now to the figures, one possible network document delivery system, generally designated at 10 in the figures, according to the invention will be described in detail. The network shown includes at least one document generator 11, such as a networked personal computer, having a client user interface 12 installed therein; a server 13 having main job processing software 14 therein including a server user interface 15; and two or more document output devices 16. FIG. 3 shows a representative hardware connection configuration or network on which the invention may be implemented.

Figure 1:
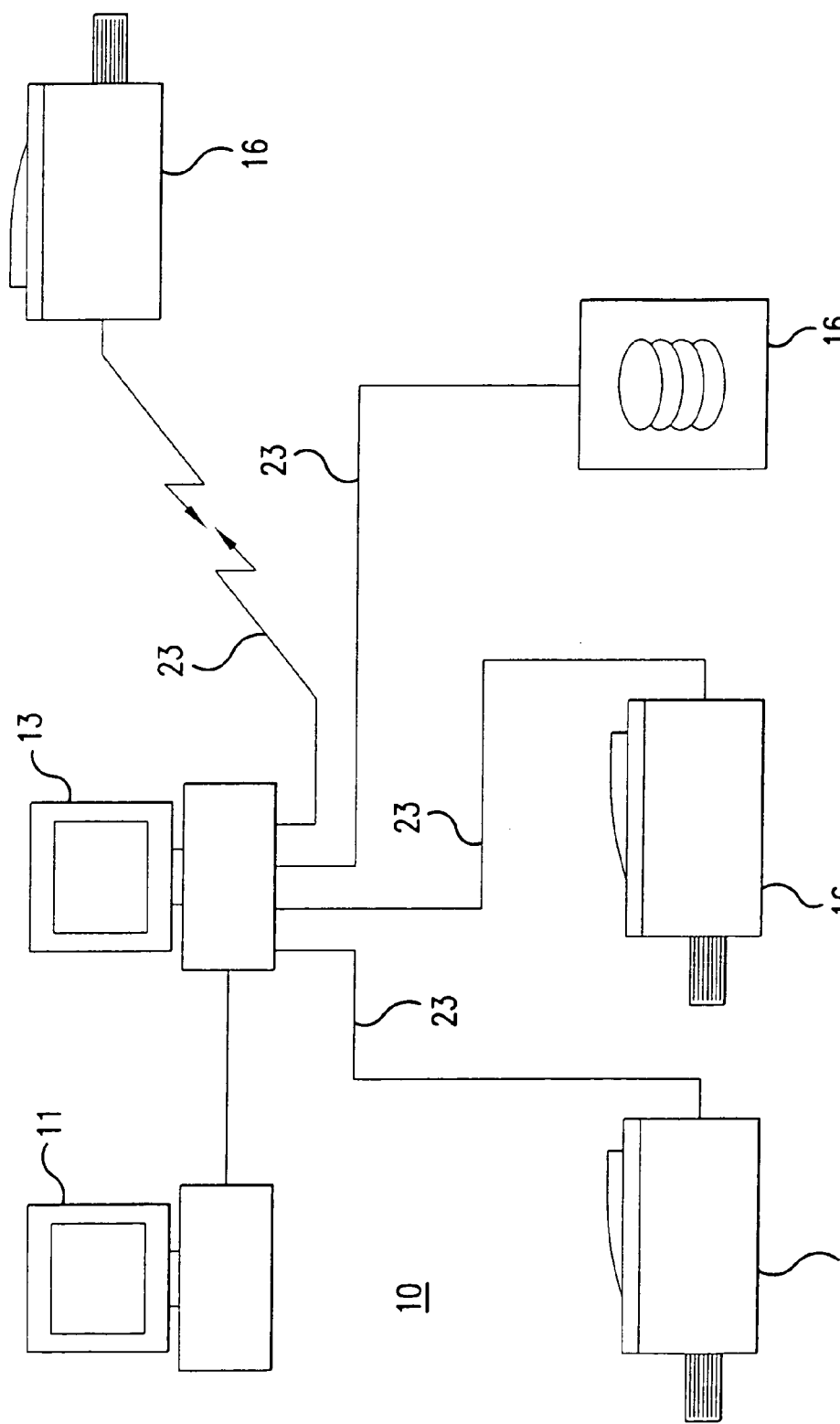
FIG. 1 is a schematic representation of a network document delivery system according to the invention.
Figure 2:
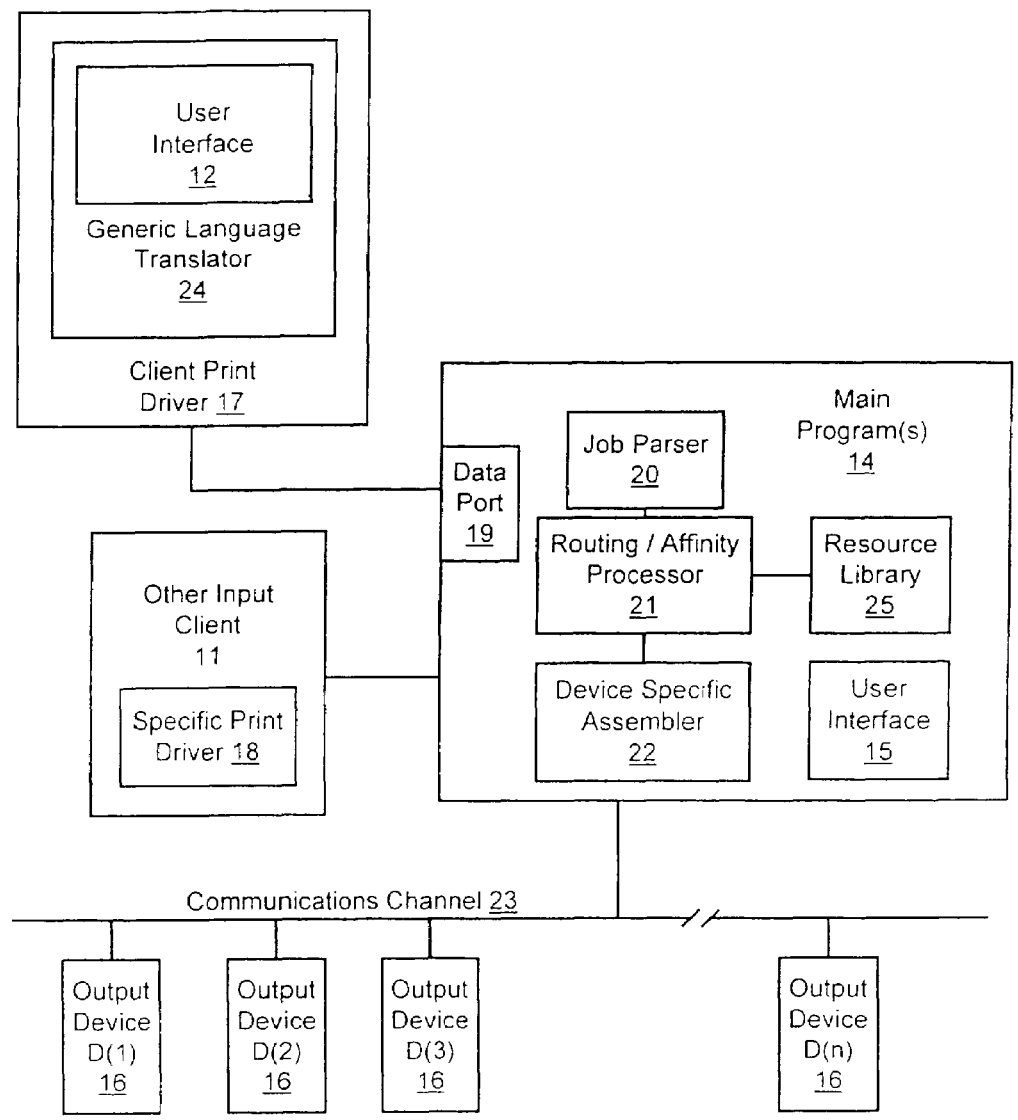
FIG. 2 is a block diagram illustrating the functional aspects of the software.

The simplified user model illustrated in FIG. 2 provides a procedural view of system operation. In this model, the overall system may include a main program 14, multiple data sources, such as client print driver 17, and/or other input clients, such as a manufacturer specific print driver 18, and multiple output devices 16.

A job is sent from a data source such as document generator 11 to main program 14 via a data port 19. A job must contain a data stream to be rendered, also referred to as image data, on some output device. The job may also contain a job ticket, which is a collection of specific information concerning the desired output presentation, such as a standard hard copy print job; a fax; an archival; an email; finishing features; routing information; and even billing information.

In the case, where print driver 17 is used, here when the user selects "auto" as the print destination, job ticket information is provided by client print driver 17. In this case print driver 17 includes a generic language translator 24 which translates an electronic document into a non-specific, or printer independent, printer language file and appends to this file a job ticket containing any other rendering characteristics which may not be supported by the printer independent language. In other cases, the job information may be provided by 'default' job tickets or port profiles associated with a data port, a user name which can be determined from the network name, or a system default job ticket.

Job parser 20 examiners the incoming job for a job ticket and applies default job tickets as requires, then sends the job to routing and affinity processor 21. Routing and affinity processor 21 determines the capabilities required to complete the job successfully and the affinity of each potential output device for the job. Routing and affinity processor 21 assigns an affinity value to each print job based upon the job size, destination and rendering characteristics by comparing the requested features with the available features logged in resource library 25. Available resources may be gathered and logged into resource library 25 by server 13 automatically by polling the network for resources. Additionally, the information may be manually entered by a user or system administrator or it may be input by a combination of the two methods. The job is then routed to a device specific assembler 22, also sometimes called the 'transform', to change the image data to a device specific form. The image data is then sent to the appropriate output device(s) 16 via a communications channel 23. In addition, the current status of each device can be monitored by the main program via communication channel 23.

Most commonly, output devices 16 are printers, but they can also be fax machines, electronic storage media, such as a 'file' on diskette, removable media, hard disk, tape drive, network drive, etc., or even email.

The simplified model can be extended to include multiple data ports with an associated default job ticket or port profile for each. A combination of port and port profile is referred to as a 'virtual queue'. Also, note that client print driver 17 can reside on the same host as main program 14, so that the operator of main program 14 can also submit jobs.

While the simplified user model illustrated in FIG. 2 provides a procedural view of system operation, the following illustrative embodiment takes advantage of the multitasking nature of a host operating system, such as WINDOWS NT and the capabilities of object oriented programming techniques. This embodiment is illustrated in FIG. 4.

Here, the main program is actually a set of programs running simultaneously. Also, the job parsing, routing, and assembling functions are spread out over a set of objects. One possible set of object models are shown in FIGS. 4–10. An explanation of the notation is included in FIGS. 56–61, but in general, diamonds show relationships between models, and triangles denote hierarchy. For instance, referring to FIG. 5, a job is a task, and a job includes at least one document. Tasks may have one or more parent/child relationships. External agents, such as the human operator, are also represented by objects, even though the object may not have a corresponding software implementation.

Figure 4:
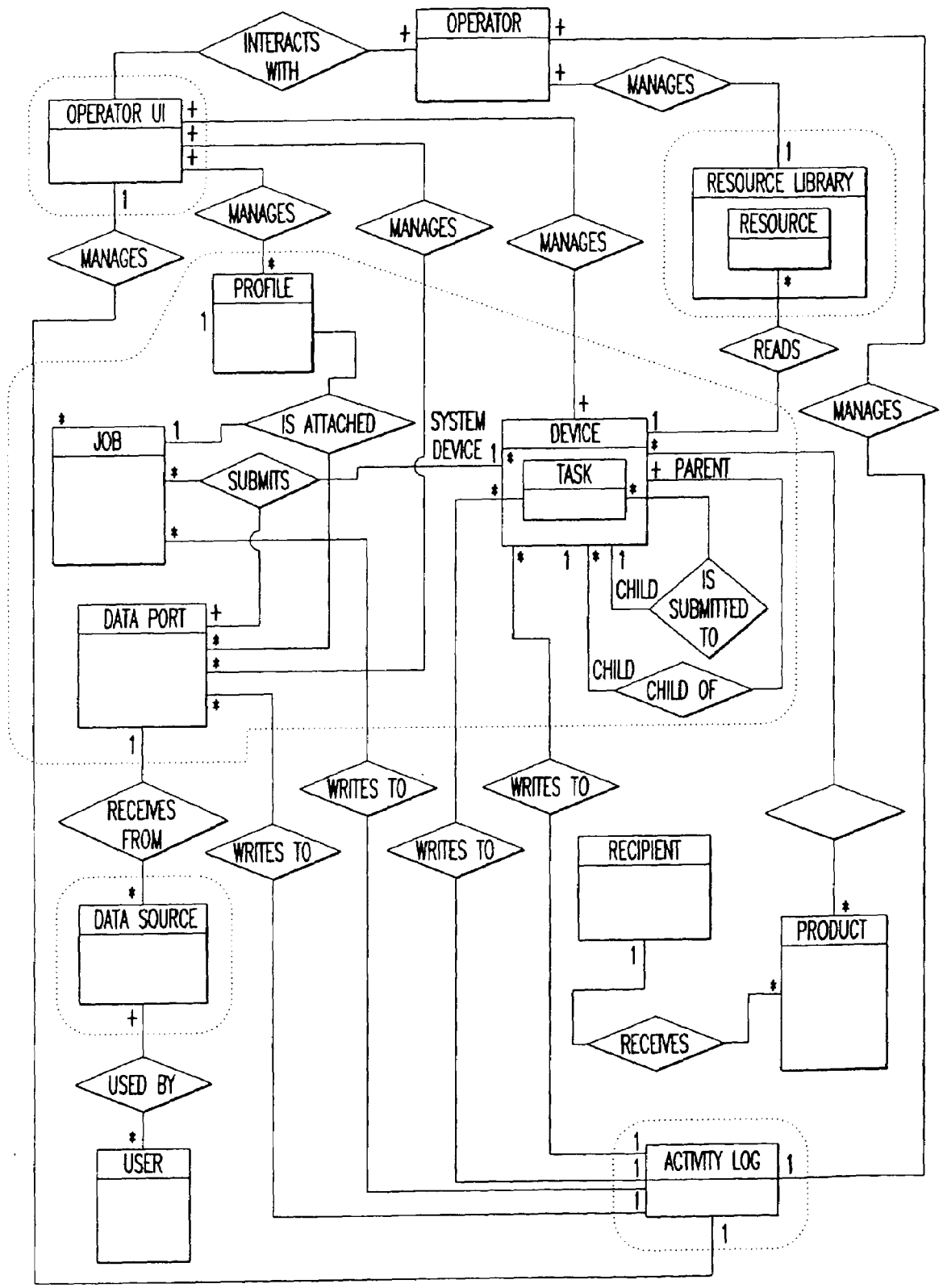
FIG. 4 is a graphic representation of a high level system object model of the invention.
Figure 6:
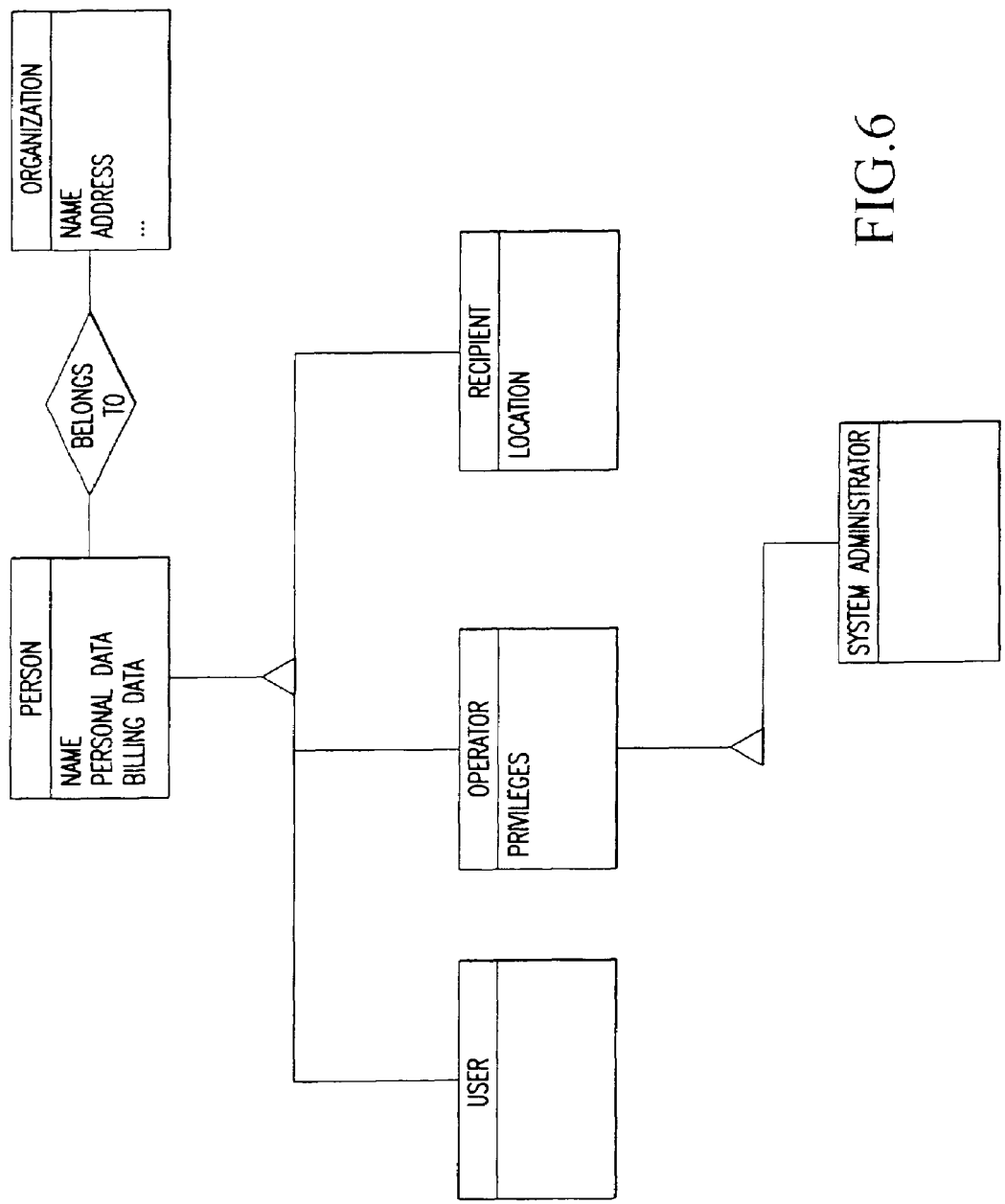
FIG. 6 is a graphic representation of a subordinate level object model showing the relationship between users and objects.
Figure 7:
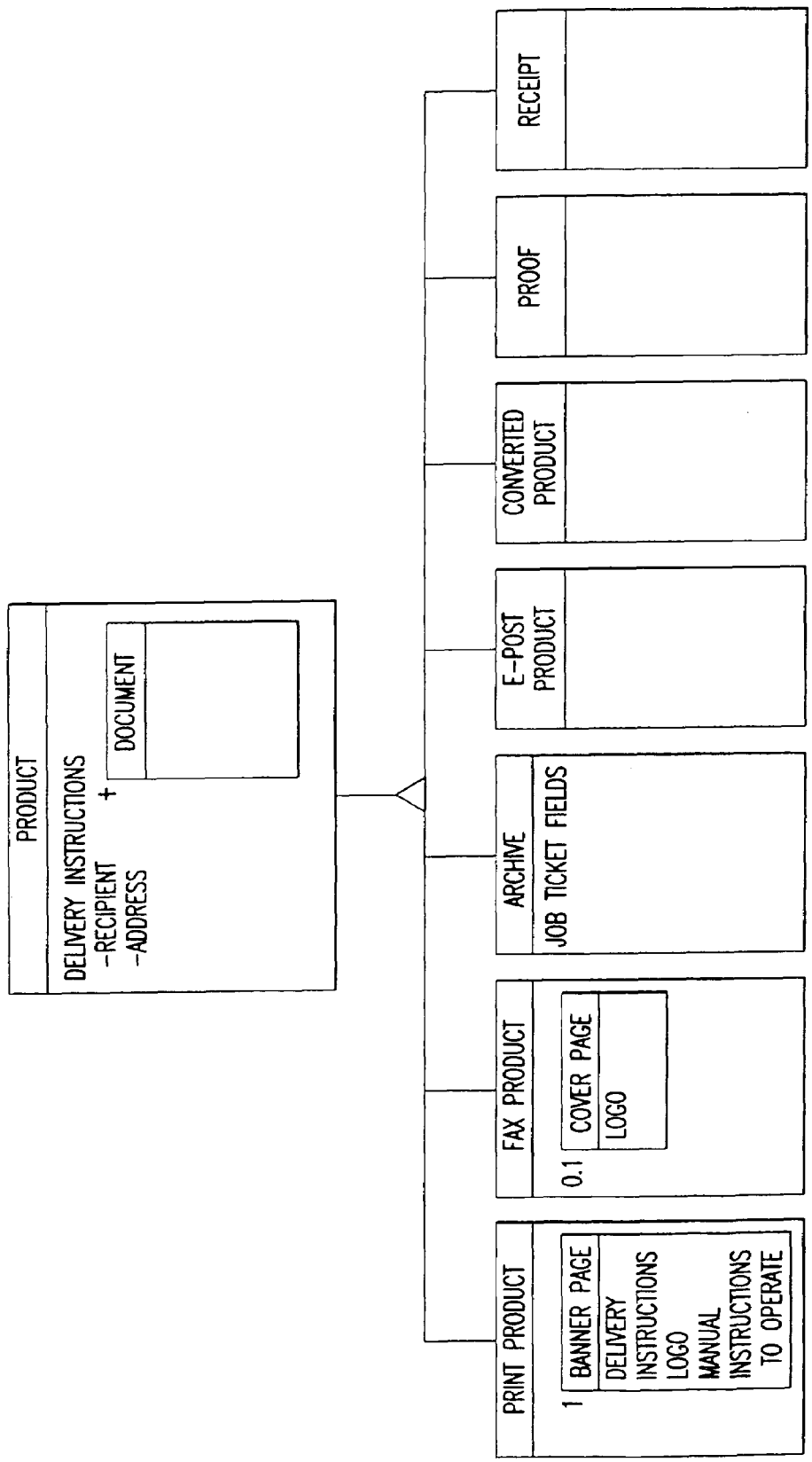
FIG. 7 is a graphic representation of a subordinate level object model showing the relationship between the general product and different types of output.

Each of the objects shown in FIG. 4 can be decomposed or broken down into other objects as shown in the other figures. The objects enclosed within dashed lines are programs. The Operator, Recipient, and User are people as shown in FIG. 6. A Product is the output of the system as shown FIG. 7.

Figure 8:
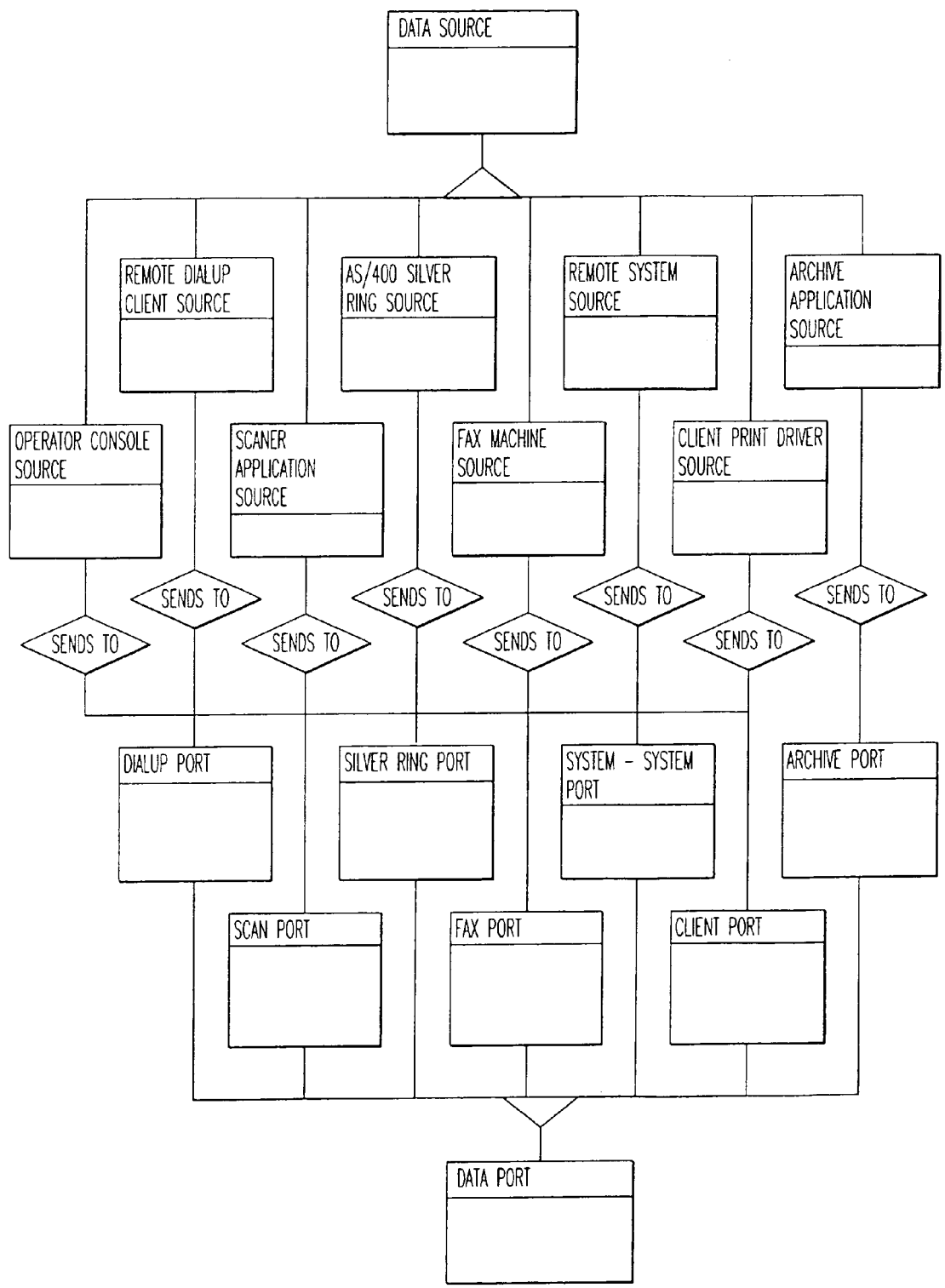
FIG. 8 is a graphic representation of a subordinate level object model showing the relationship between a data source and the data port.

A job is created by a data source such as a document generator 11 and more specifically, usually by client print driver 17. FIG. 8 shows a more detailed view of possible types of data sources and their relationships to data ports. Note that remote systems can send jobs just like any local source. Likewise, a remote system may be configured as a device. This allows passing of a job from system to system, in a distributed network-like manner. The purpose for configuring the systems this way is to reduce phone charges by using local area network (LAN) communications between main systems. This allows jobs to be passed to LAN or phone connected printers, even though the printers are not available to the local system.

Figure 5:
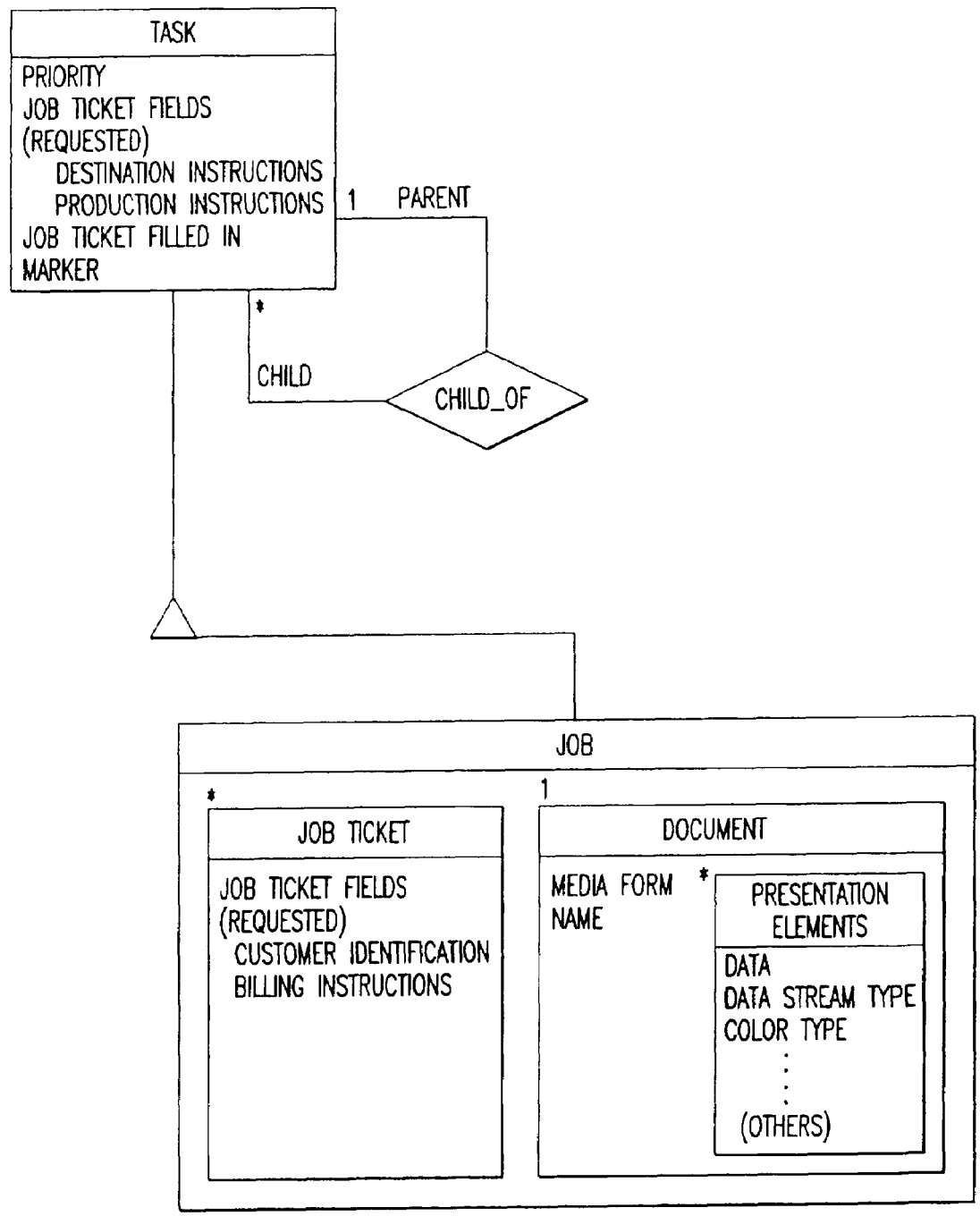
FIG. 5 is a graphic representation of a subordinate level object model showing the relationship between a task and a job.

The data source passes the job to the data port. Note that everything inside the area surrounded by the dotted line, including the data port, are the main programs. The job parsing function is performed by the data port. The port creates a job object in the system that includes a document, i.e. image data, and job ticket as shown in FIG. 5. The job ticket may need to be formed from an associated port and/or user profile, i.e. a default job ticket. The job ticket is designed to allow routing of the job to the best device and storing of data for billing and management purposes. The job ticket allows separation of the job specific features, such as number of copies, finishing, recipient information, etc., from the image data. Eventually job specific information needs to be in a form unique to each printer or output device, depending on its manufacturer and its configuration as it was installed, as some finishing features such as sorters and staplers are optional. The specialization of the generic or device independent data stream to the actual production device data stream is done after the production device is chosen by the system.

Figure 9:
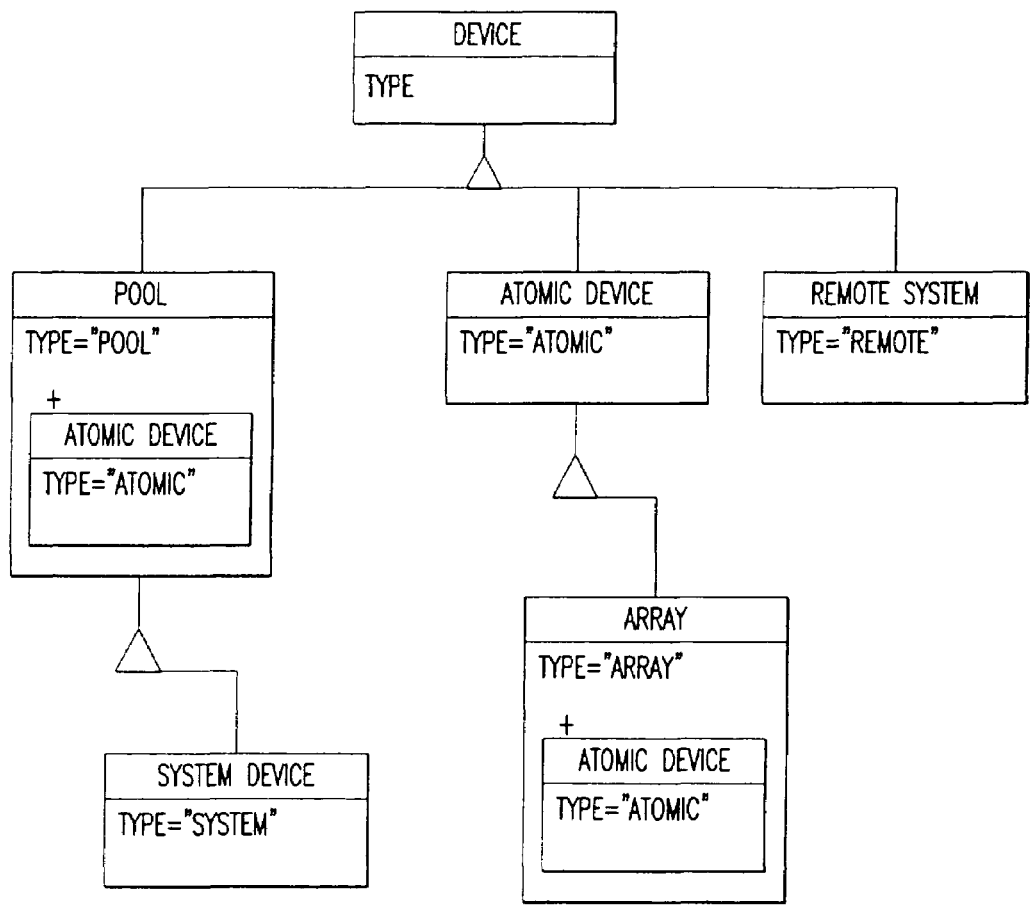
FIG. 9 is a graphic representation of a subordinate level object model showing the relationship between a general device, a pool of devices, an atomic device, a remote system, a system device and an array of devices.
Figure 10:
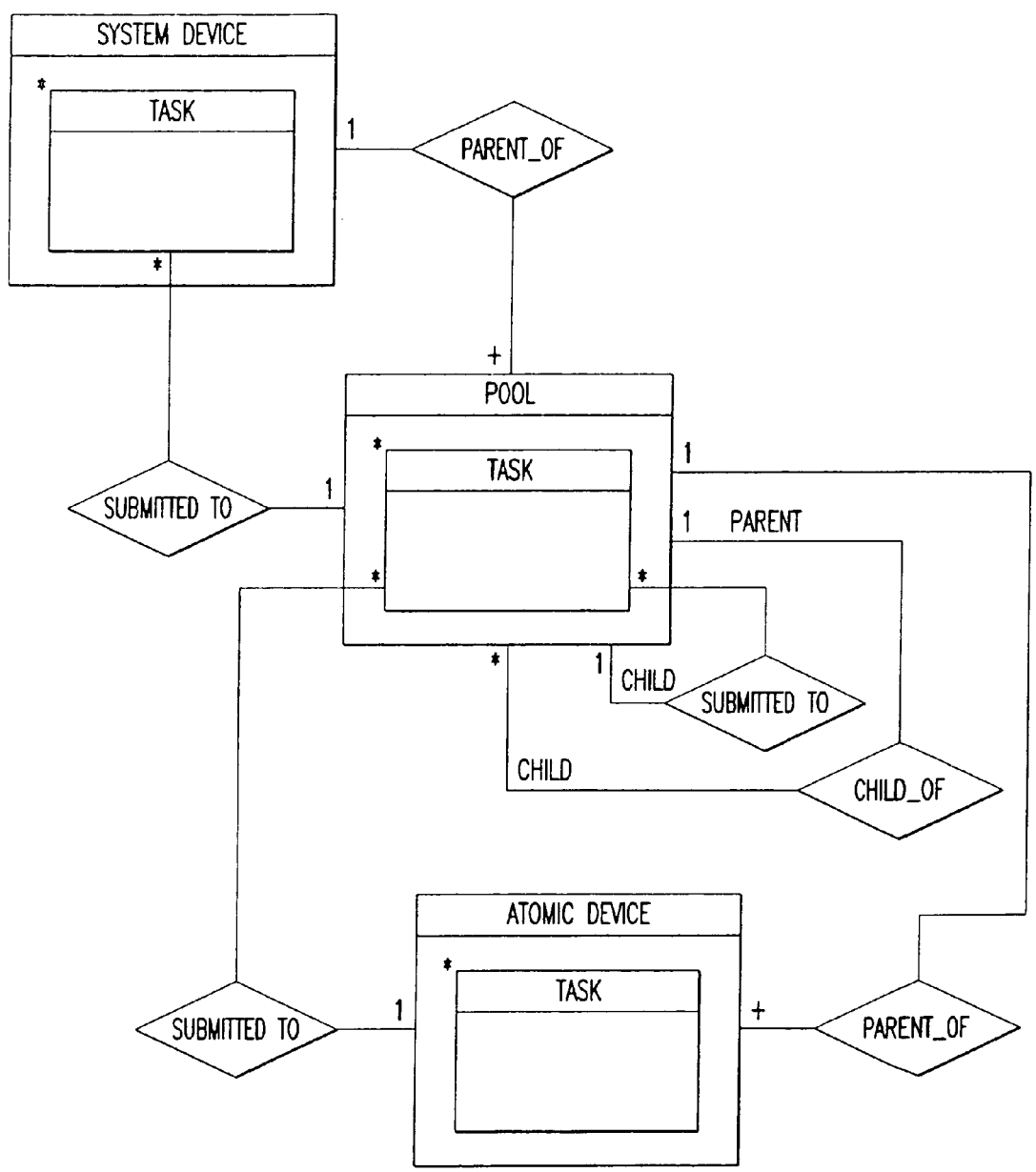
FIG. 10 is a graphic representation of a subordinate level object model showing the hierarchical relationship between a system device and an atomic device.
Figure 56:
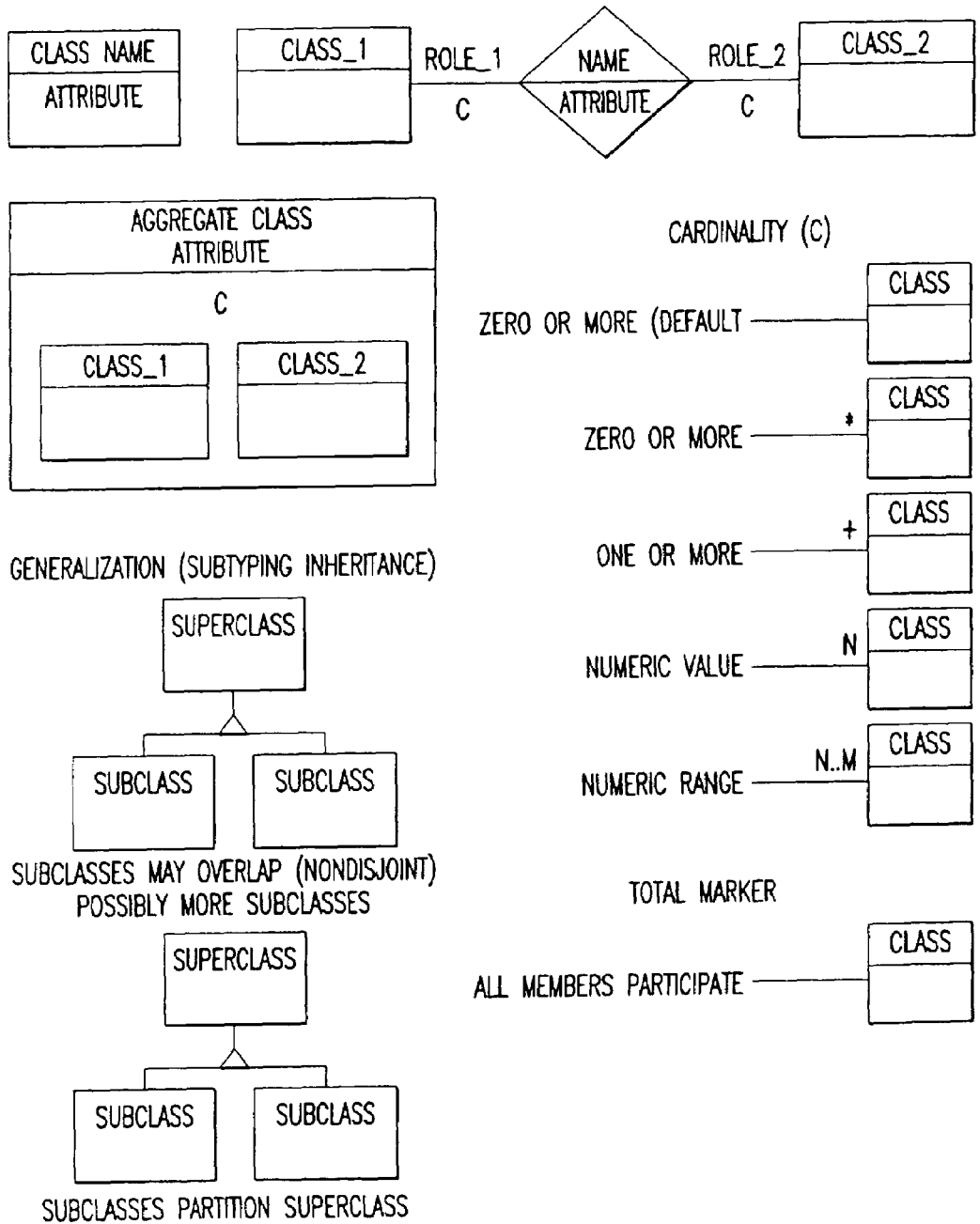
FIG. 56 describes the Fusion notation used in FIGS. 4 through 10.
Figure 58:
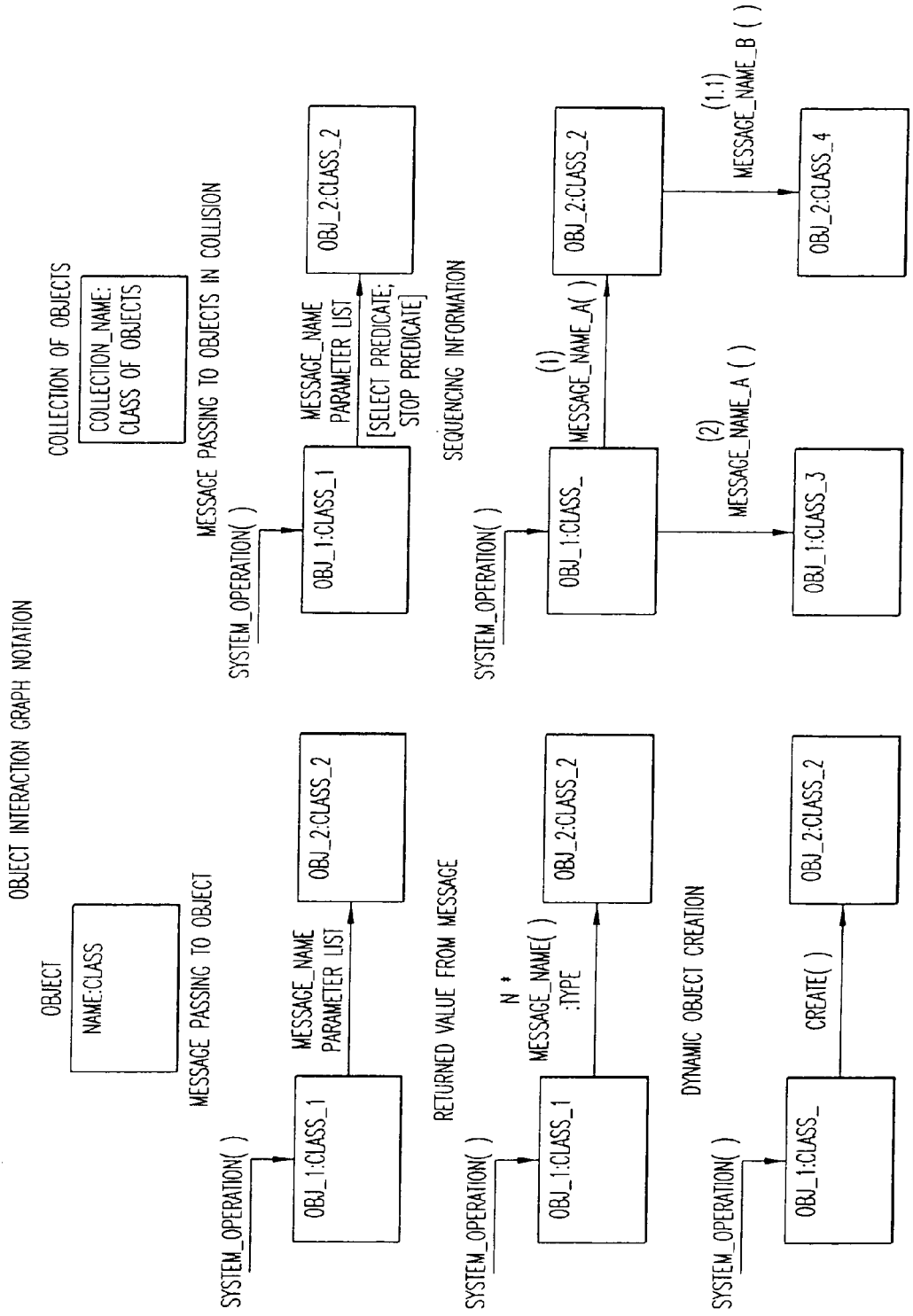
Figure 59:
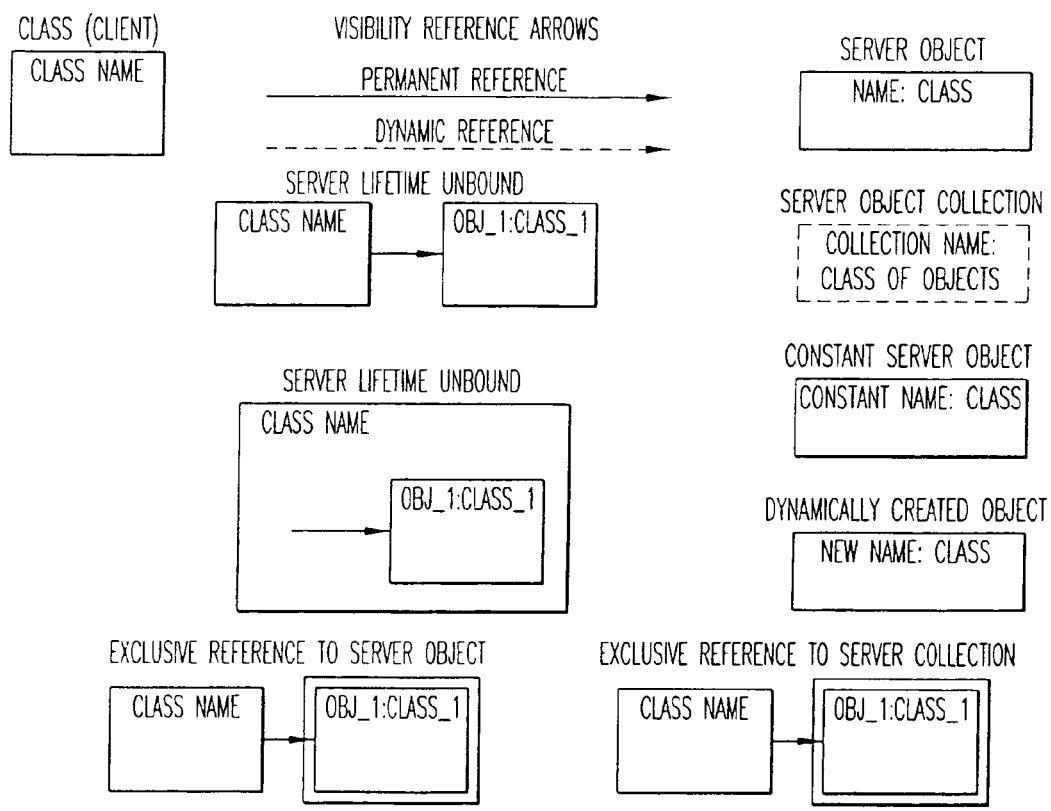
Figure 61:
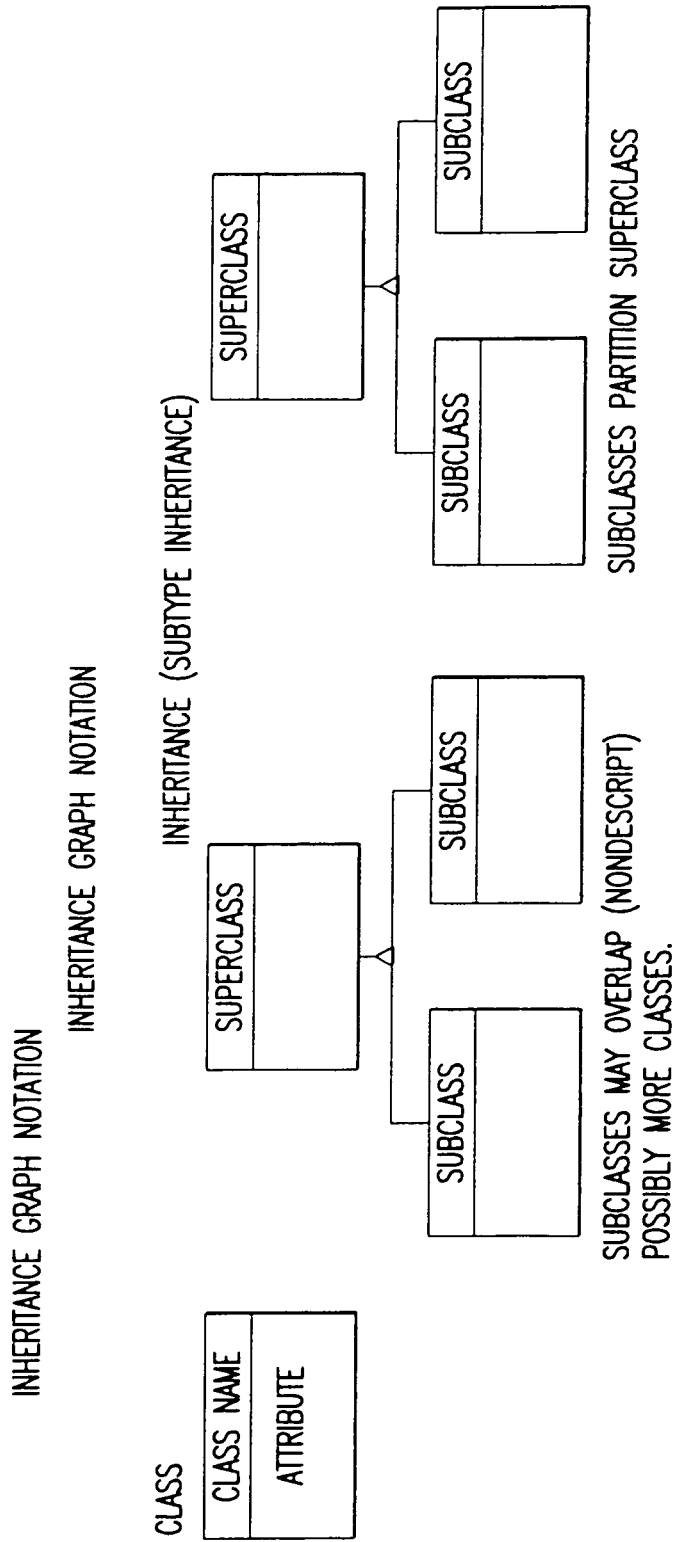
Figure 62:
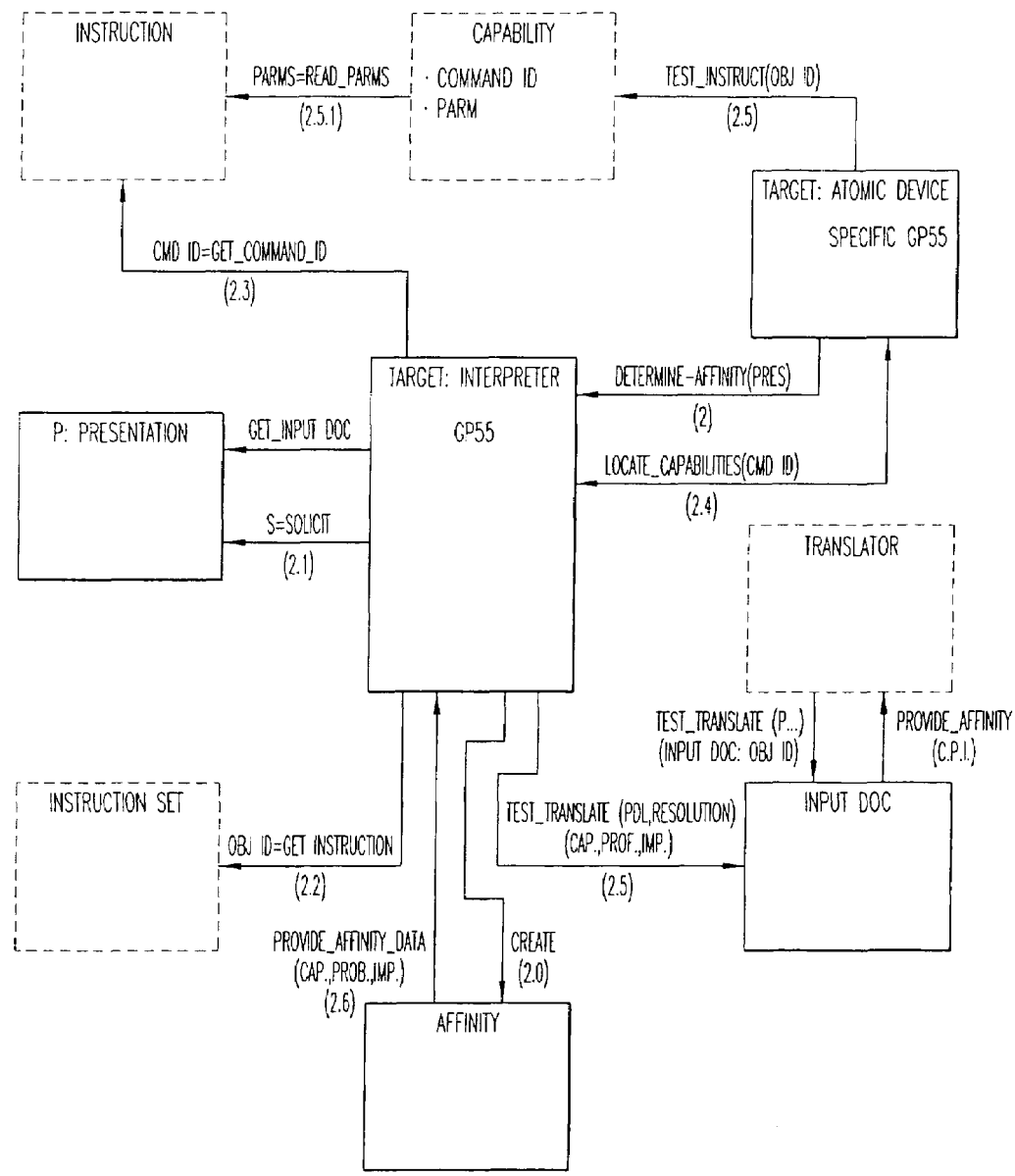
FIG. 62 is an object interaction graph illustrating how affinity is determined.
Figure 63:
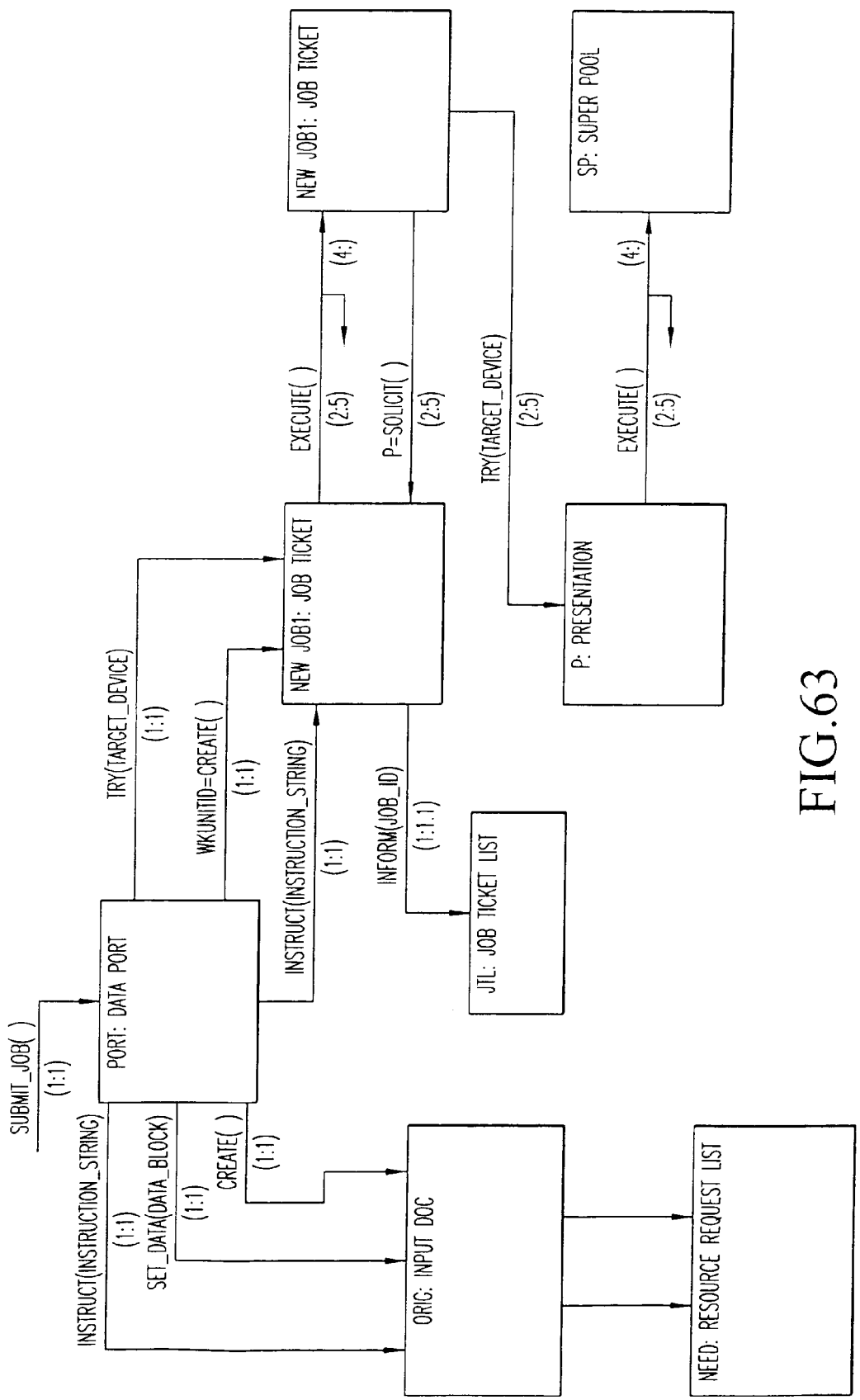
FIG. 63 is an object interaction graph illustrating the submit job sequence.
Figure 64:
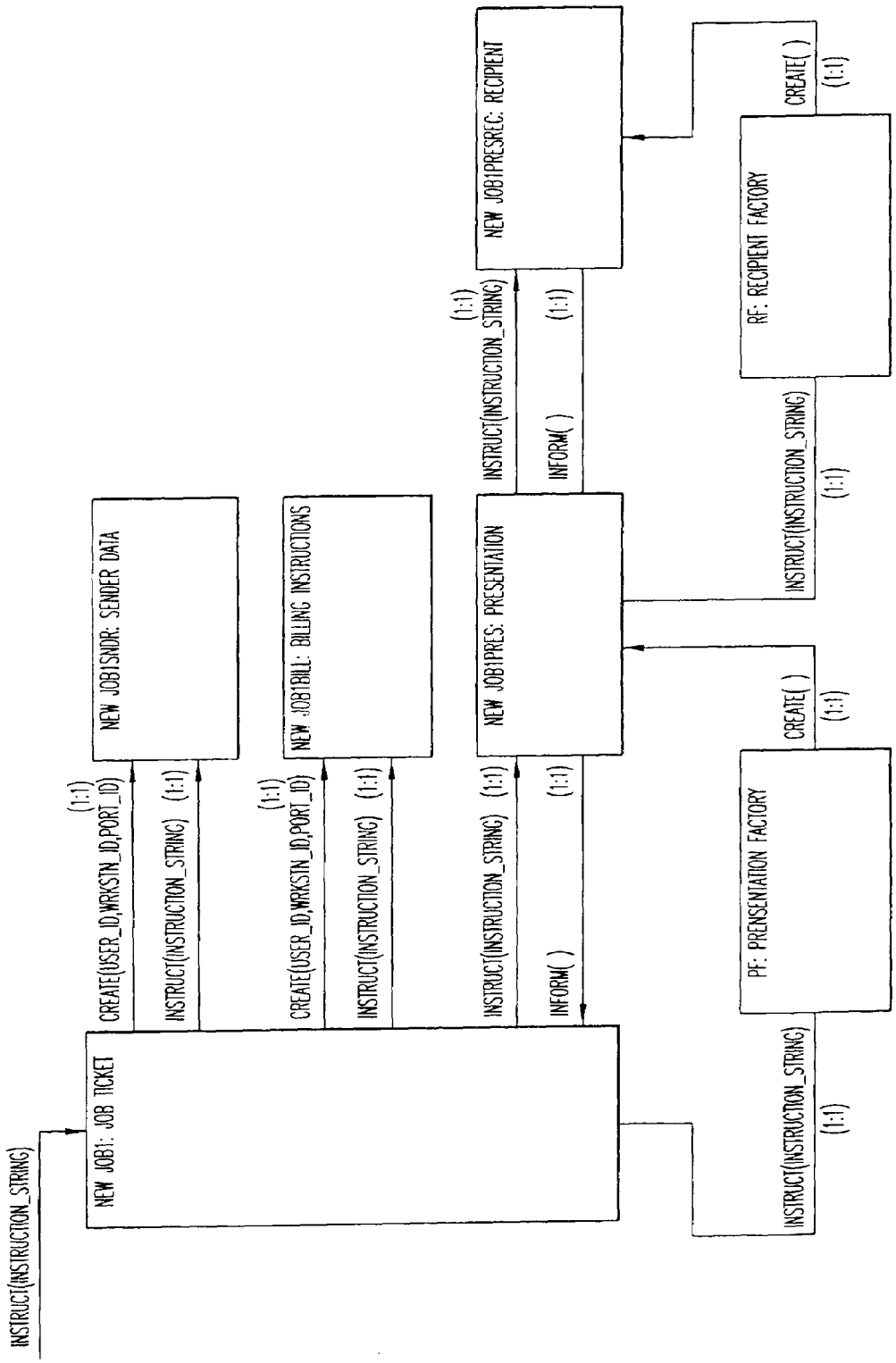
FIG. 64 is an object interaction graph illustrating the instruct to job ticket sequence.
Figure 65:
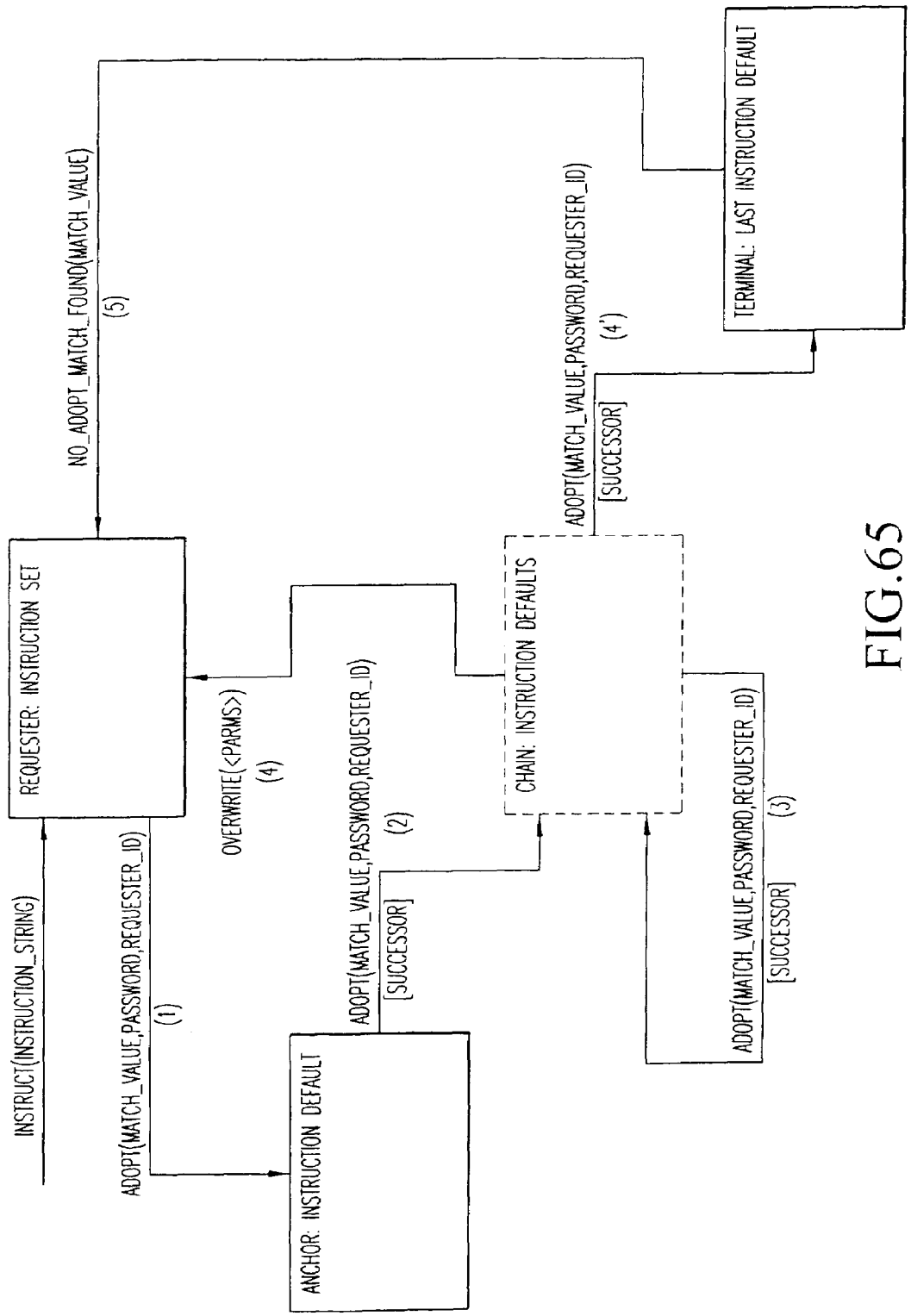
FIG. 65 is an object interaction graph illustrating the instruct to instruction set sequence.
Figure 66:
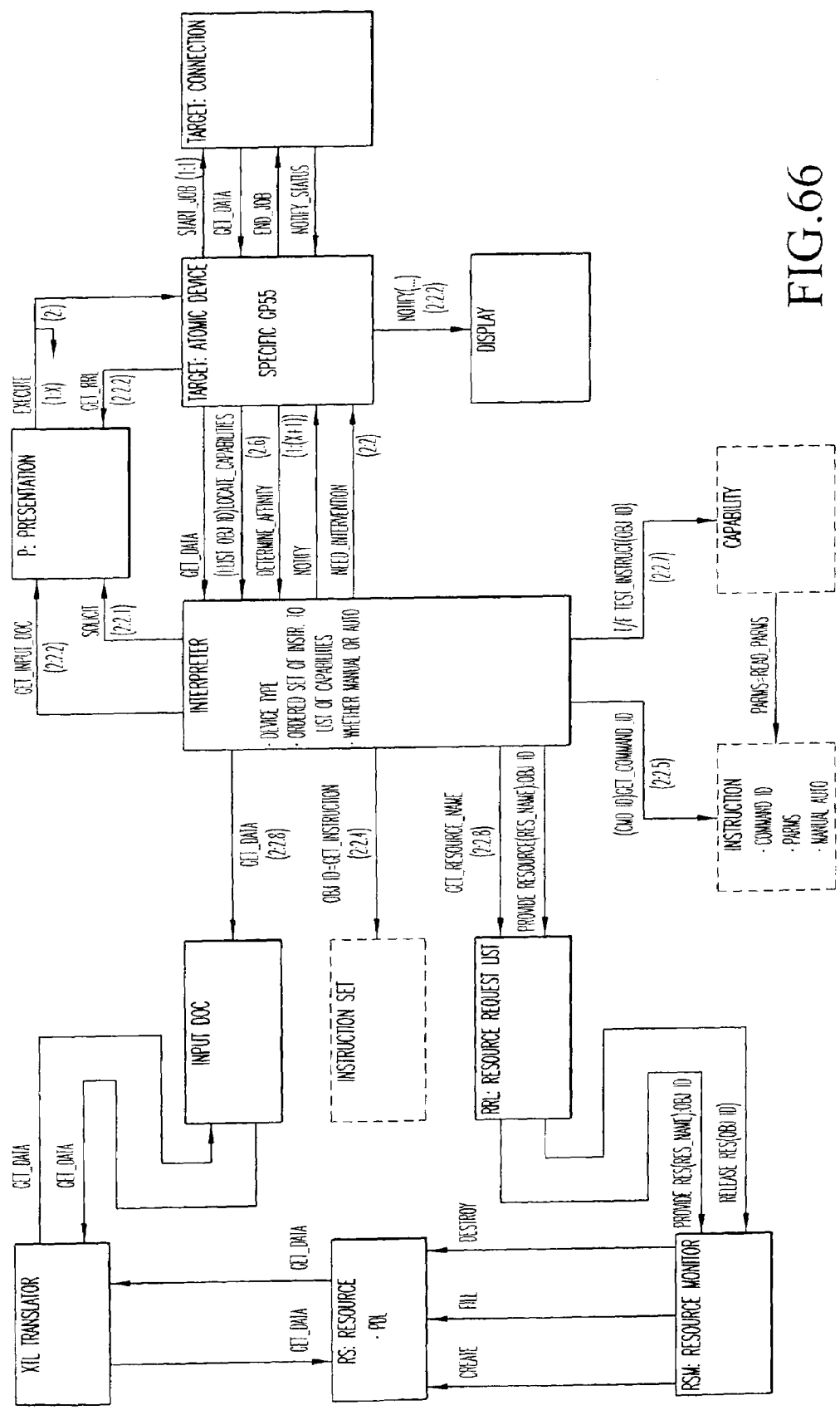
FIG. 66 is an object interaction graph illustrating the normal execute sequence.

The data port creates a job and passes it to the system device. FIG. 9 shows the device hierarchy, and FIG. 10 shows the device relationships. There is only one system device in the system, and it is always the first device to receive each job. Every device examines the job to see if it can produce it, decompose it into tasks, or route it to a child device. Thus, the devices contain the routing function shown in the simplified model. All devices are implemented as objects. Device objects are serialized meaning configuration parameters are stored to disk so that they may be restored after a system reset.

A key feature of the device design is the relationship between pools, arrays, and atomic devices as illustrated in FIG. 10. A pool is generally a grouping of like devices. The grouping can be by function such as faxes, printers, or archive devices, or by some other criteria such as location, e.g. all printers on the second floor, permissions, or routing. An array is a collection of like devices. An atomic device represents the smallest whole constituent part. As far as the parent pool is concerned, an array is an atomic device, and thus the array class is derived from the atomic device class. At the lowest level, an atomic device 'knows' that it is capable of producing a product, and thus will determine its capabilities and will calculate an affinity for a given job. All devices are ultimately derived from a single device class. This design pushes specialization to the lowest possible level. If a device needs a particular resource to produce a product, fonts or electronic forms for example, it submits a request to the resource library.

Devices contain many of the unique features of the invention. As an example, arrays are defined as collections of devices which are capable of receiving and producing the desired output. The device hierarchy and built in routing capability allow arrays to break a job down into tasks, one task per copy. The separate tasks are sent to each of the devices constituting the array as each device is ready to receive it. Another example of a unique feature is the intelligent routing accomplished through capabilities and affinities. The logic for routing is built in to each atomic device. The pass/fail response on capabilities and affinity number for a task is passed to the parent device, which then compares the responses from each child device and sends the task to the appropriate device.

Another unique feature of the invention is intelligent translation of a job defined for one type of output device into another. Incoming jobs are often in a data stream that is incompatible with the best fit output device. The intelligent translation device performs the appropriate translation based upon a separate determination of the best fit output device. A current embodiment is capable of translating from POSTSCRIPT to various forms of HP-PCL and PDF.

Other unique features can include color separation where pages with color data are separated from a predominately black and white data stream and sent to a color printer. Most of the document will be printed on a black and white printer which generally has a lower cost per page than color printers. This feature can be implemented by configuring the client print driver to put page boundary markers in the source document data stream.

The resource library and activity log or journal are advantageously coded as separate systems running simultaneously with the main system. The activity journal may be a database containing various tables, entries, queries, and reports relevant to the system. The database interface can be provided by the operating system. The database and its schema, e.g. tables, queries, etc., are created at system startup if they don't already exist. Exemplary database tables might include: an ActionLog which contains system startup and configuration change information; a Billing log which contains originator billing information; a Company log which contains company address information; a FaxList log which relates fax completion statistics to recipients; a Job log which contains job information, such as start time, stop time, originator, etc.; an Originator log which contains originator information such as address, phone number, etc.; a Recipient log which contains recipient address information; a Recipient list which relates jobs to recipients; a Task log which contains task information such as start time, stop time, production device, etc., and a device log which contains physical device information.

The operator user interface allows the operator to configure the main system for the needs of a particular installation, and is implemented as a separate program from the main system. The main system is capable of operating without the operator user interface running. The operator user interface also saves and loads job templates. Job templates are job tickets that have been saved for later use, and can be edited before submitting a job.

When the user selects "Auto" instead of a specific printer in the graphical user interface, the invention examines the job ticket information to route print jobs to the most effective printer. This feature may be disabled during configuration. If a specific printer is selected by the user, and the printer does not exist, then the job remains unassignable.

Each job is routed to a printer depending on whether the job can be printed at all, printer capabilities, and the best fit of additional performance or post-processing factors, i.e. the affinity of the job to a printer or printer to a job.

Devices have a subset of attributes that define the types of tasks that can be processed. If a task requests a function that is outside the set defined by the device's attributes, then the device is considered to be incapable of processing the task. The attributes include the range of number of pages allowed in a single task, the ability to print color or strictly back and white pages, the ability to print duplex, and the ability to support a requested paper size, color or weight. A task's requirements must fall within all of these restrictions. A task for which no capable devices can be found is considered "Unassignable".

In addition to the above attributes each device is given a unique name, and also has an indicator that specifies if the device should be a candidate during "Automatic Assignment". Automatic Assignment is device selection that is insensitive to the device's name. If Automatic Assignment is not allowed by a device, and the task does not request that device specifying its name specifically, then the device is considered incapable. If a task requests a specific device, all devices that do not have the name requested are also considered incapable. If no device by the requested name is present in the system, or if no direct path to the requested device is present, then the task is changed to allow Automatic Assignment without regard for originally requested device name. If no device name is ever requested by the task, Automatic Assignment is assumed.

Devices have another subset of attributes that define the device's ability to automate a number of processing options which include the device's processing performance, and the operator's preference toward device. The affinity value for a device is calculated by accumulating the individual affinities given by examining each of the individual attributes.

The automation attributes include the device's ability to collate, to staple, to fold, to drill, to bind, and to add covers. If a task requests one of these functions, the devices that provide the function are given a higher affinity than those devices that do not provide the function. Additional automation functions supported by the device, that are not requested by the task, are simply ignored.

The device's performance is given as a single Impressions Per Minute (IPM) value. The assumption is made that one minute is the optimal average amount of time that a device should spend processing a single task, and that thirty seconds is the standard deviation. A standard bell curve is used to assign relative affinities to each device for a given task.

The operators preference is given as a single value from one to ten. A higher value gives a higher affinity. Each of the above factors is weighted so that a priority relationship between them can be enforced. A higher priority factor will take precedence over any single factor with a lower priority, and the sum of all factors with lower priorities. The priority standings are as follows: 1) Collation; 2) Stapling; 3) Folding; 4) Stitching, Drilling, Binding, and Cover Insertion; 5) Operator Preference; 6) Cost; and 7) Performance.

Array Pools and the devices under them have special routing issues. The capability and affinity rules described above must be adjusted to account for these issues. An array is capable of processing a task if any of the devices under it are capable of processing the task. There are two adjustments to the standard capability testing performed by the devices under the array. The allowable number of pages and the requested device name are tested at the array level, not at the subordinate device level. The page range is not used because it is not always known ahead of time how many pages each device in the array will print. The device name testing would allow a maximum of only one device to be capable of defeating the purpose of the array.

The affinity of an array can be determined by averaging all of the affinities of the capable and available subordinate devices. There is only one adjustment to the standard affinity calculations performed by the sub-devices. The device's performance is not factored into the result because, again, the page count for each device is not known. All other affinity factors are evaluated normally.

FIGS. 11 through 55 describe a life cycle model of one embodiment of the invention. The life cycle model describes the order in which system operations may occur. The life cycle model, together with the system operation schemata shown specifically in FIGS. 13 through 55, fully describe the behavior of the system.

The following rules apply to interpreting the life cycle model and schemata:

Alphabet. Any input or output event may be used in an expression. Output events are prefixed with #.

Operators. Let x and y be life-cycle expression, then:
x.y denotes x is followed by y.
x|y denotes either x or y occurs.
x* denotes zero or more occurrences of x
x~ denotes zero or more occurrences of x simultaneously
[x] denotes that x is optional.
x∥y means arbitrarily interleaving the elements of x and y.

Substitutions. An expression can be named in a substitution:

Name=Life-Cycle Expression

Name may be used in other expressions, but substitutions must not be recursive.

Operator precedence. In decreasing order the precedence is:
[ ], *, +, . , |, ∥

Expressions may be bracketed to override default precedence.

The Operation models in the Life Cycle Model are done through textual schemata. Each schema within the schemata shown in FIGS. 13 through 55 lists seven sections: (1) Operation—the name of the system operation being described; (2) Description—a free-form abstract of the intent of the operation; (3) Reads—a list of values that are accessed but not changed by the operation; (4) Changes—a list of values that may be modified by the operation; (5) Sends—output events sent by the operation to objects outside the systems (these objects are known as agents); (6) Assumes—a list of conditions that are assumed as being true when the operation begins (if the conditions are not true and the operation is invoked, then the operation's actions and results are undefined); and (7) Result—the conditions and changes in state that are true when the operation has completed.

Figure 67:
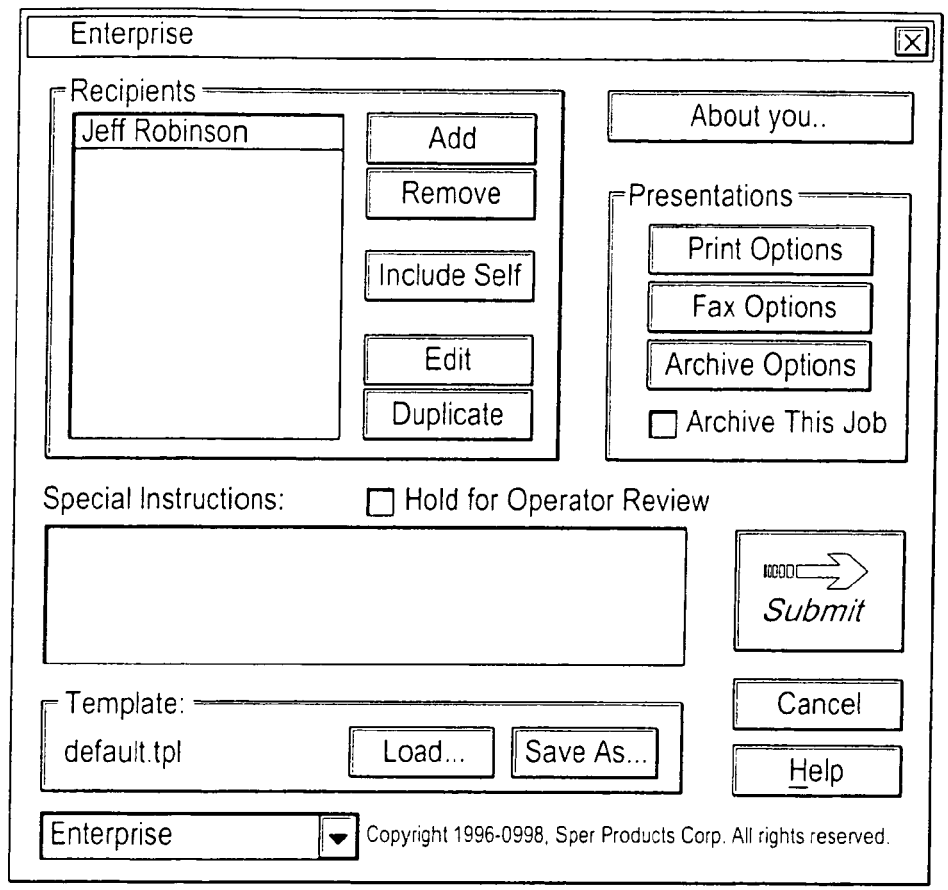
Figure 68:
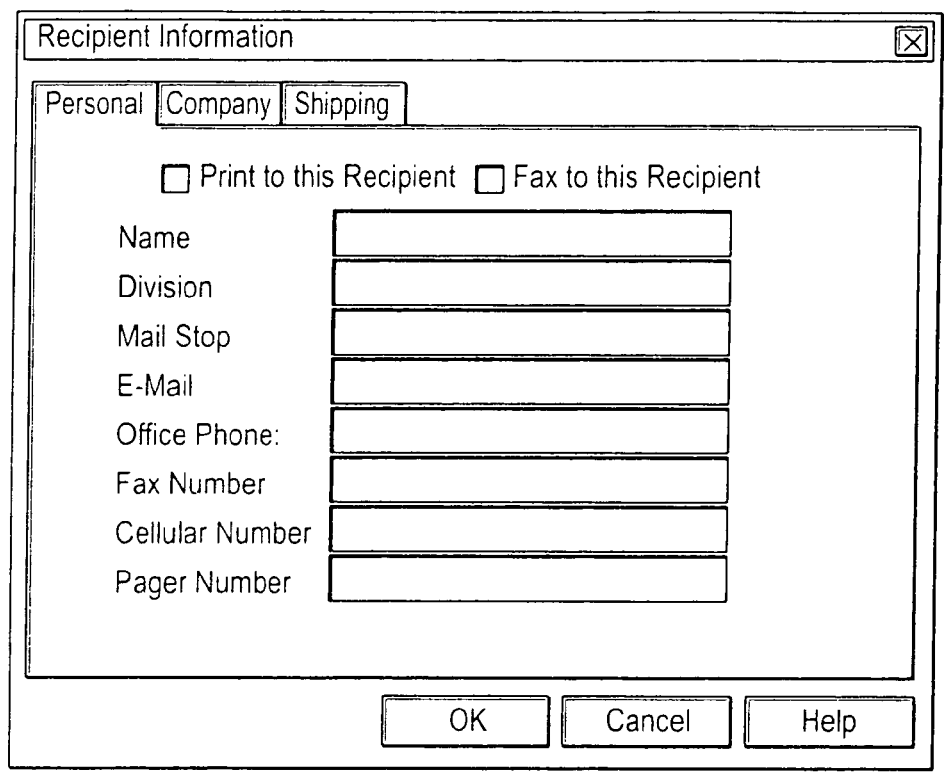
Figure 70:
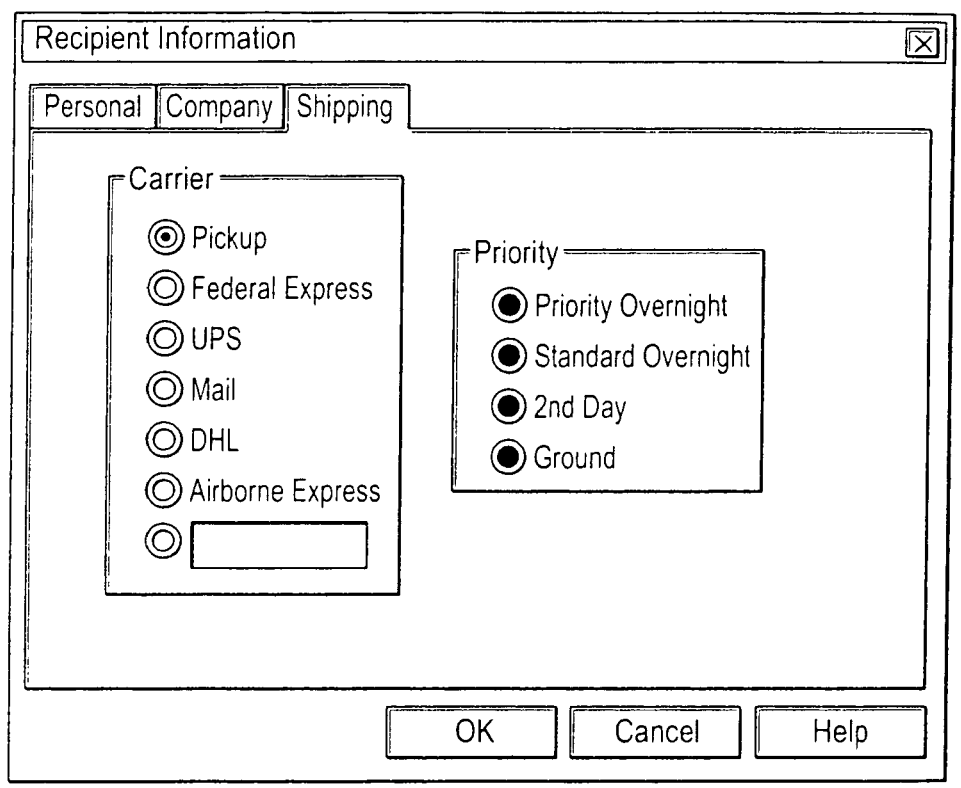
Figure 71:
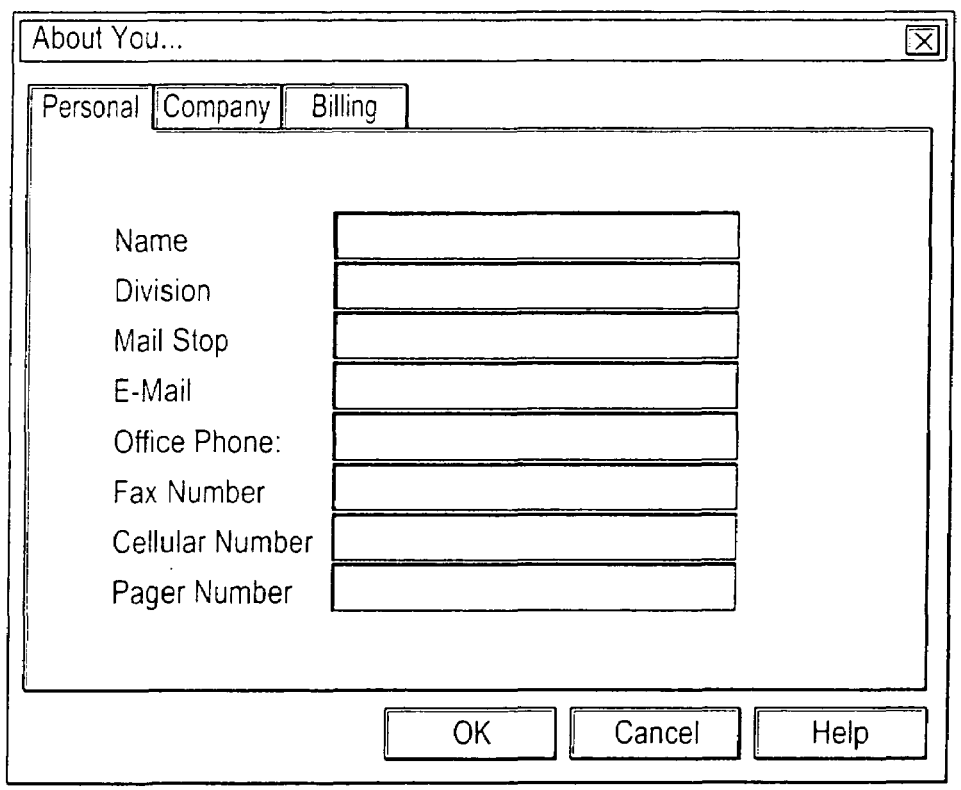
Figure 72:
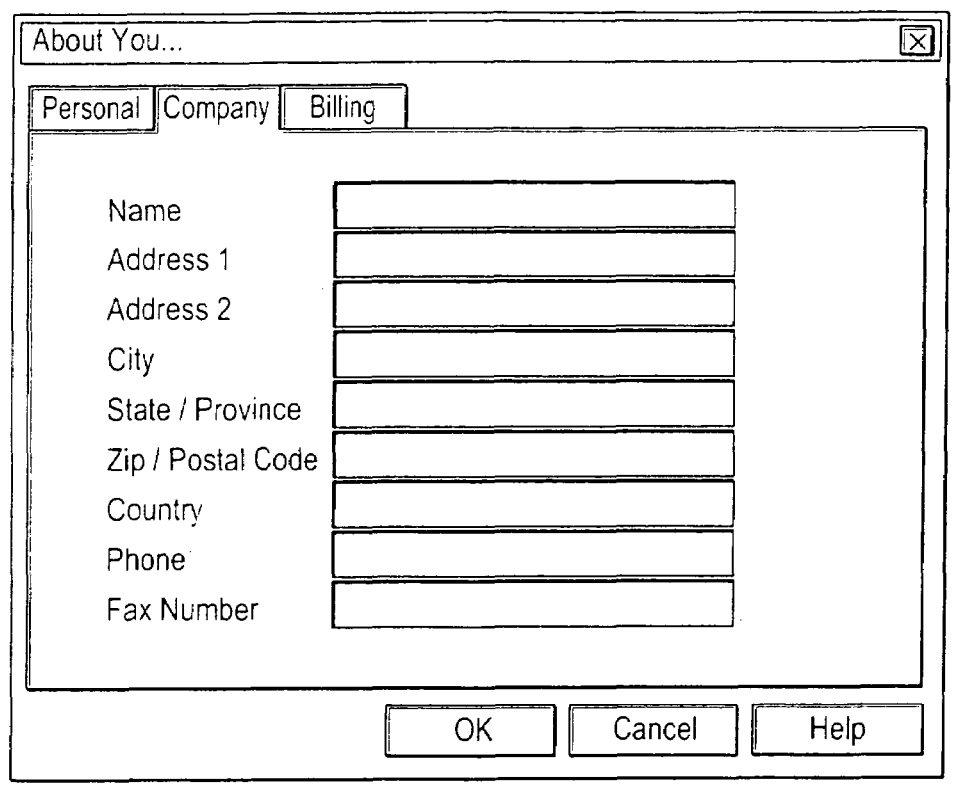
Figure 73:
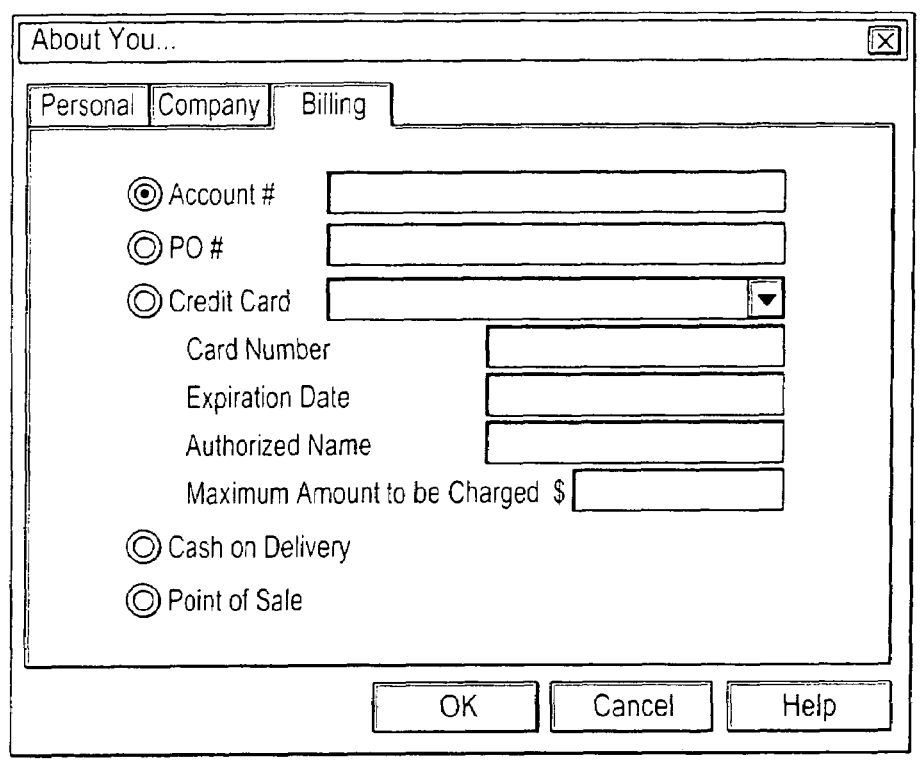
Figure 74:
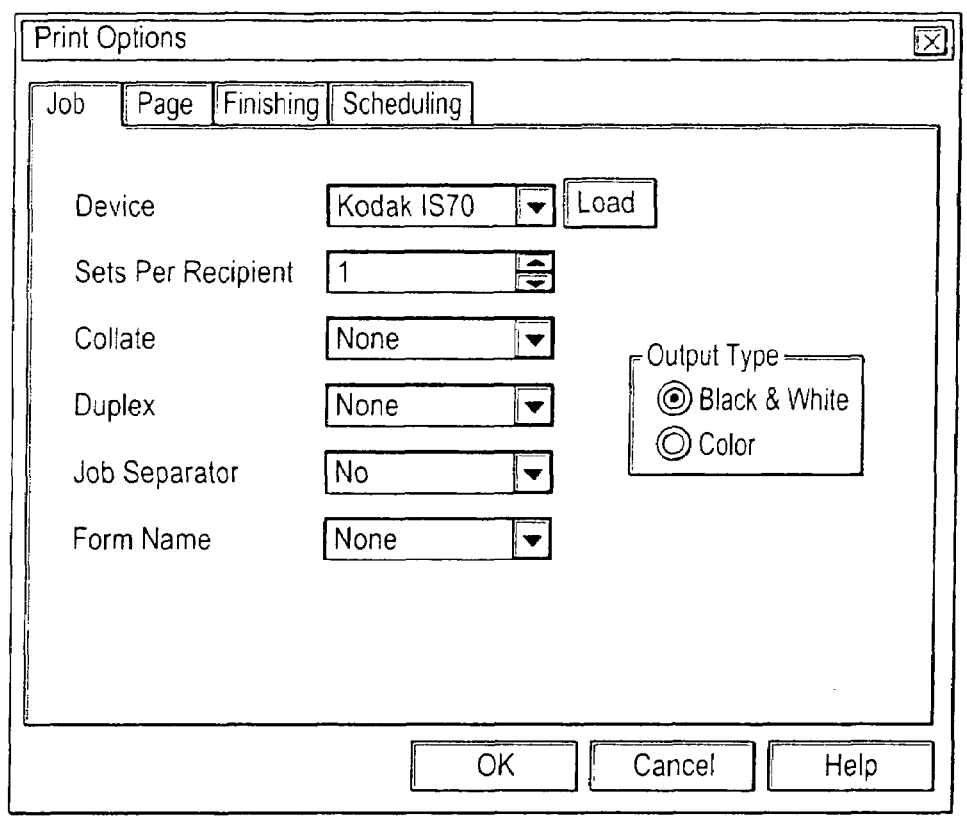
Figure 75:
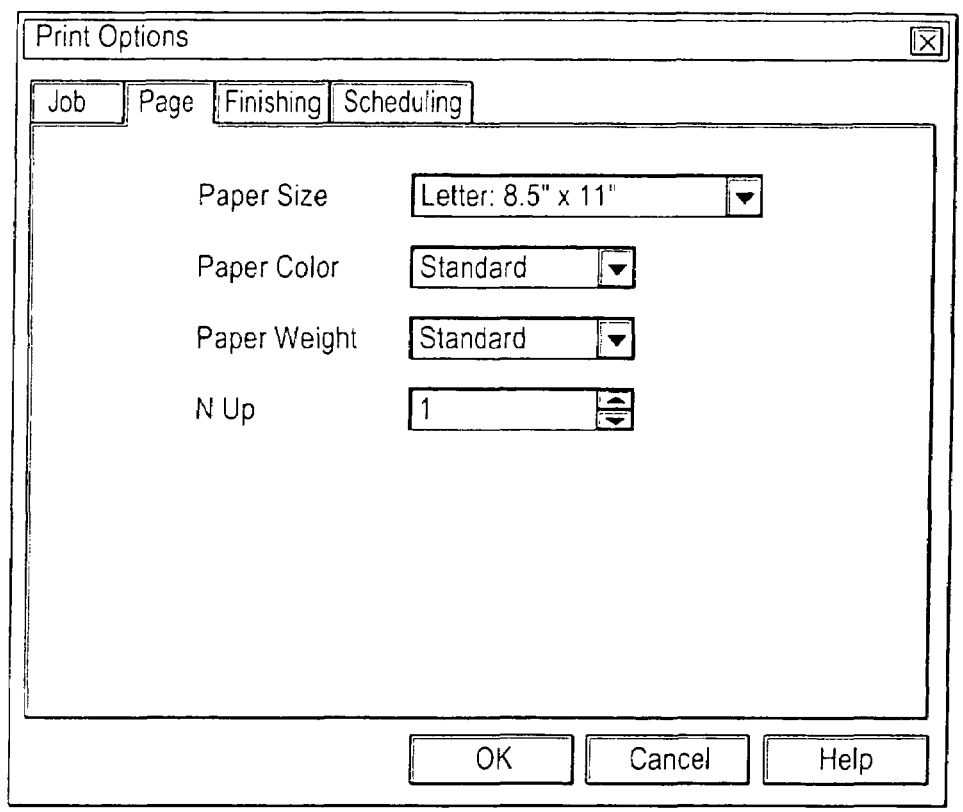
Figure 76:
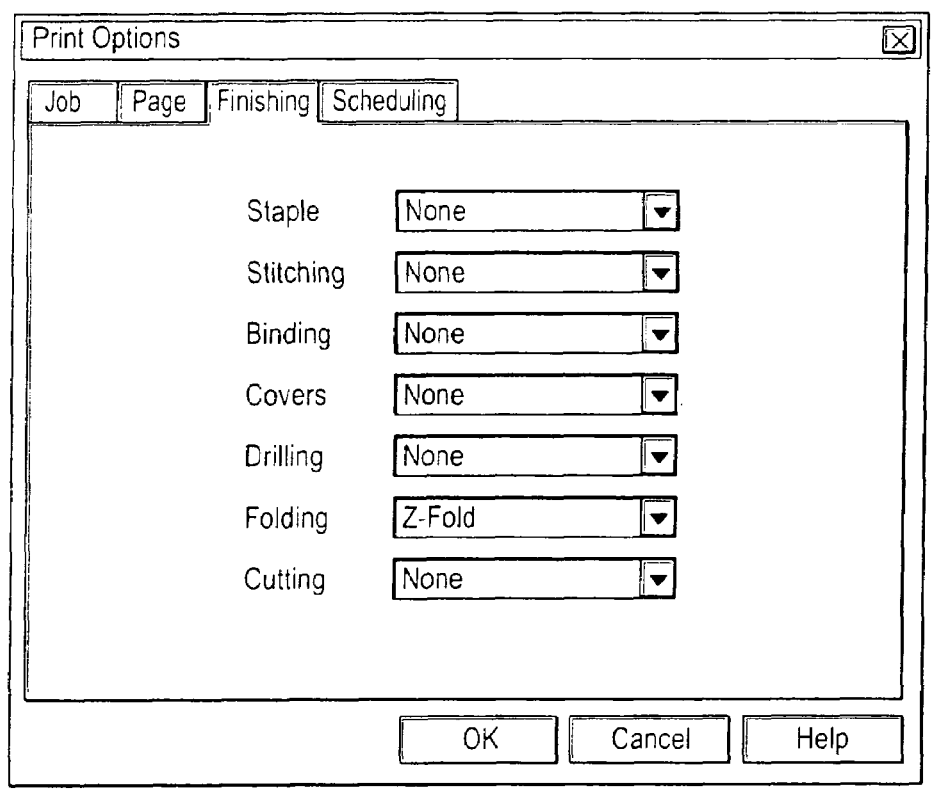
Figure 77:
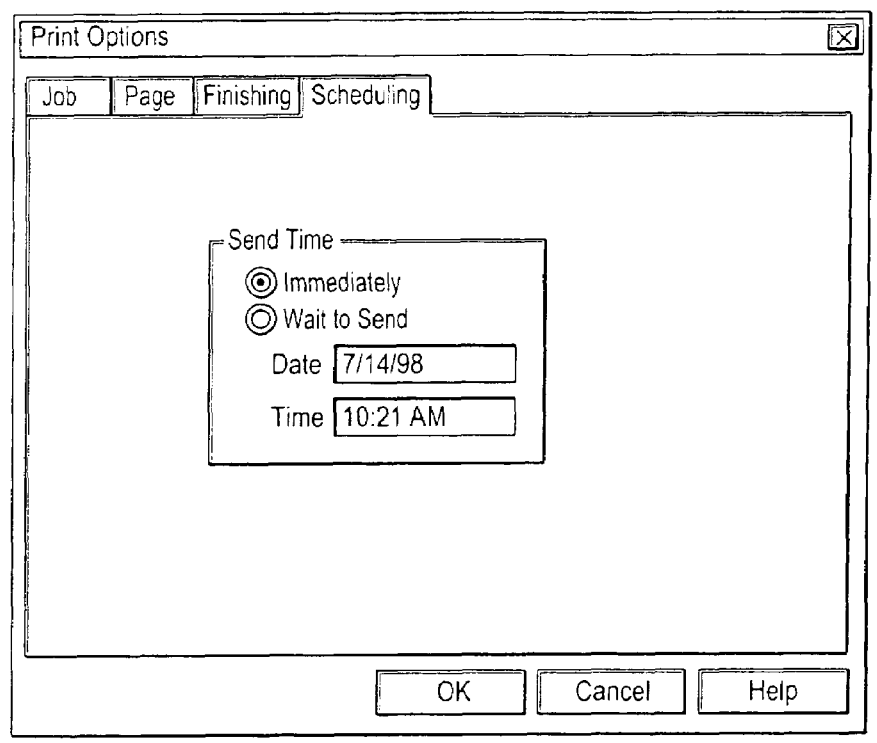
Figure 78:
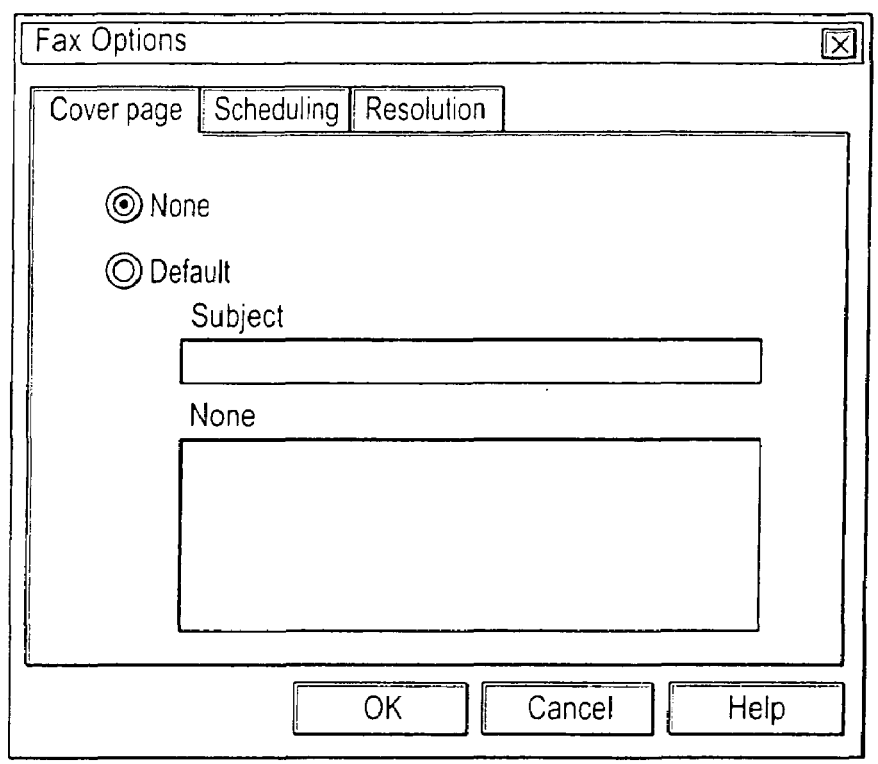
Figure 79:
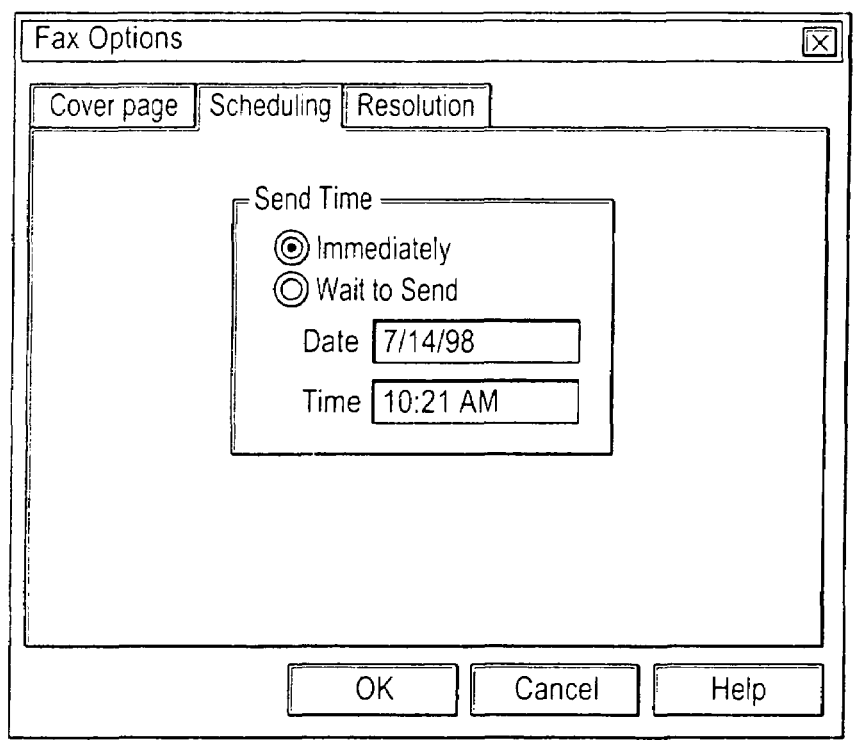
Figure 80:
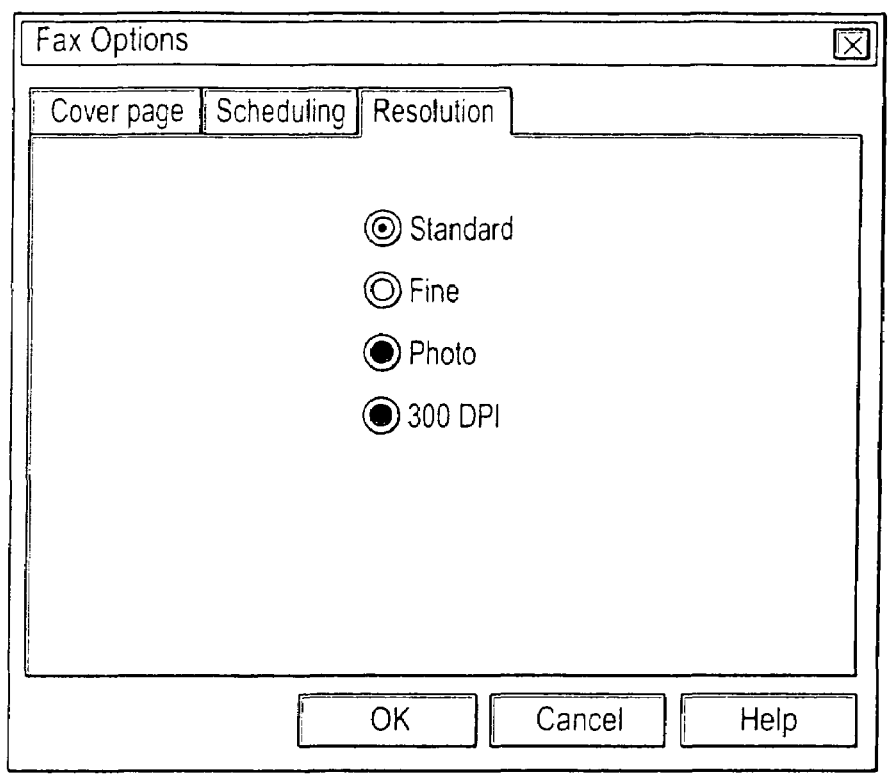
Figure 81:
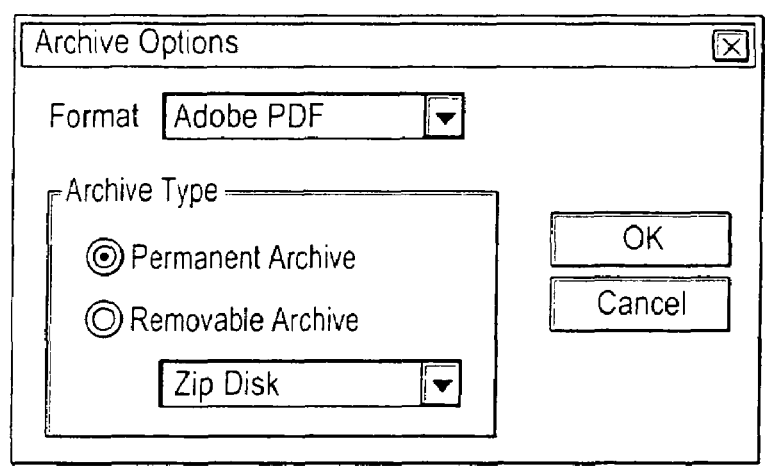

The recipient and result based paradigms mentioned earlier can be better understood making reference to FIGS. 67–81. In the recipient based paradigm, a user simply selects the recipient from the recipient list as is shown in FIG. 67. The information is then delivered to that recipient based upon the recipient's preferred device or devices. New recipients can be defined by entering the new recipient's information, such as that shown in FIGS. 68–70, or possibly as a result of that particular recipient joining the system as a new user by entering new user information, such as that shown in FIGS. 71–73. Printing and delivery options can be selected by entering in the desired characteristics on the job ticket such as those shown in FIGS. 74–81.

The result oriented delivery paradigm is more of an inherent result of the design of the invention and is directly related to the affinity feature and a device's capability to produce the requested output. Prior to this invention, output characteristics beyond the capability of a particular output device either simply were not presented as available options to the user or were altered, usually by being eliminated altogether, by the device specific print driver as the job was output. With the flexibility of this invention and ability to alter the affinity weighting, all or some of the paradigms can be implemented to whatever degree is desired.

While there is shown and described certain embodiments of the invention, it is to be distinctly understood that this invention is not limited thereto but may be variously embodied to practice within the scope of the following claims.

We claim:

1. A system for delivering documents across a network providing an integrated solution to deliver a document to one or more different destinations or recipients, regardless of an end form which the document is presented, which system comprises:
   a document generator at a client's side and configured to translate an input data stream into a data stream having an output device independent format; to embed additional data into the data stream indicative of at least two disparate desired output presentations, selected from hard copy print job, fax, archival and email; and to output the device independent format data steam;
   a computer configured to receive the device independent format data stream and programmed to analyze the data stream to determine a best output device by comparing any features required by the data stream with features of any output devices available to the computer; and
   the computer further being programmed to translate the device independent data stream into a device specific data stream for the best output device and to transmit the device specific data stream to the best output device.

2. The system of claim 1 wherein the document generator is further configured to embed data into the data stream indicative of a job ticket containing information including rendering characteristics for a generated document and at least one task.

3. The system of claim 2 wherein the computer is further programmed to determine a best output device based upon an affinity value for each output device and whether a particular output device is capable of producing what the data stream requires.

4. The system of claim 3 wherein the output device includes a plurality of commonly capable output devices and the computer is programmed to transmit at least a portion of the data stream to each of the commonly capable output devices.

5. The system of claim 4 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

6. The system of claim 5 wherein the output device includes a plurality of commonly capable output devices and the computer is programmed to transmit the data stream to each of the commonly capable output devices to distribute production of multiple copies of a document out across the commonly capable output devices.

7. The system of claim 6 wherein embedded data includes multiple tasks and each of the tasks is destined for a different output device.

8. The system of claim 7 further comprising an output device which is a separate system for delivering documents across a network.

9. The system of claim 8 wherein the document generator is configured to embed the name of a recipient for a document as opposed to specific device information; and wherein the computer is configured and programmed to deliver the document to a device based upon the recipient's name and any rendering characteristics required by the data stream.

10. The system of claim 9, wherein the computer is at a server side.

11. The system of claim 1 wherein the computer is further programmed to determine a best output device based upon an affinity value for each output device and whether a particular output device is capable of producing what the data stream requires.

12. The system of claim 11 wherein the output device includes a a plurality of commonly capable output devices and the computer is programmed to transmit at least a portion of the data stream to each of the commonly capable output devices.

13. The system of claim 12 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

14. The system of claim 13 wherein the output device includes a plurality of commonly capable output devices and the computer is programmed to transmit the data stream to each of the commonly capable output devices to distribute production of multiple copies of a document out across the commonly capable output devices.

15. The system of claim 14 wherein embedded data includes multiple tasks and each of the tasks is destined for a different output device.

16. The system of claim 15 further comprising an output device which is a separate system for delivering documents across a network.

17. The system of claim 16 wherein the document generator is configured to embed the name of a recipient for a document as opposed to specific device information; and wherein the computer is configured and programmed to deliver the document to a device based upon the recipient's name and any rendering characteristics required by the data stream.

18. The system of claim 17, wherein the computer is at a server side.

19. The system of claim 1 wherein the output device includes a plurality of commonly capable output devices and the computer is programmed to transmit at least a portion of the data stream to each of the commonly capable output devices.

20. The system of claim 19 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

21. The system of claim 20 wherein the output device includes a plurality of commonly capable output devices and the computer is programmed to transmit the data stream to each of the commonly capable output devices to distribute production of multiple copies of a document out across the commonly capable output devices.

22. The system of claim 21 wherein embedded data includes multiple tasks and each of the tasks is destined for a different output device.

23. The system of claim 22 further comprising an output device which is a separate system for delivering documents across a network.

24. The system of claim 23 wherein the document generator is configured to embed the name of a recipient for a document as opposed to specific device information; and wherein the computer is configured and programmed to deliver the document to a device based upon the recipient's name and any rendering characteristics required by the data stream.

25. The system of claim 24, wherein the computer is at a server side.

26. The system of claim 1 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

27. The system of claim 26 wherein the output device includes a plurality of commonly capable output devices and the computer is programmed to transmit the data stream to each of the commonly capable output devices to distribute production of multiple copies of a document out across the commonly capable output devices.

28. The system of claim 27 wherein embedded data includes multiple tasks and each of the tasks is destined for a different output device.

29. The system of claim 28 further comprising an output device which is a separate system for delivering documents across a network.

30. The system of claim 29 wherein the document generator is configured to embed the name of a recipient for a document as opposed to specific device information; and wherein the computer is configured and programmed to deliver the document to a device based upon the recipient's name and any rendering characteristics required by the data stream.

31. The system of claim 30, wherein the computer is at a server side.

32. The system of claim 1 wherein the output device includes a plurality of commonly capable output devices and the computer is programmed to transmit the data stream to each of the commonly capable output devices to distribute production of multiple copies of a document out across the commonly capable output devices.

33. The system of claim 32 wherein embedded data includes multiple tasks and each of the tasks is destined for a different output device.

34. The system of claim 33 further comprising an output device which is a separate system for delivering documents across a network.

35. The system of claim 34 wherein the document generator is configured to embed the name of a recipient for a document as opposed to specific device information; and wherein the computer is configured and programmed to deliver the document to a device based upon the recipient's name and any rendering characteristics required by the data stream.

36. The system of claim 35, wherein the computer is at a server side.

37. The system of claim 1 wherein embedded data includes multiple tasks and each of the tasks is destined for a different output device.

38. The system of claim 37 further comprising an output device which is a separate system for delivering documents across a network.

39. The system of claim 38 wherein the document generator is configured to embed the name of a recipient for a document as opposed to specific device information; and wherein the computer is configured and programmed to deliver the document to a device based upon the recipient's name and any rendering characteristics required by the data stream.

40. The system of claim 39, wherein the computer is at a server side.

41. The system of claim 1 further comprising an output device which is a separate system for delivering documents across a network.

42. The system of claim 41 wherein the document generator is configured to embed the name of a recipient for a document as opposed to specific device information; and wherein the computer is configured and programmed to deliver the document to a device based upon the recipient's name and any rendering characteristics required by the data stream.

43. The system of claim 42, wherein the computer is at a server side.

44. The system of claim 1 wherein the document generator is configured to embed the name of a recipient for a document as opposed to specific device information; and wherein the computer is configured and programmed to deliver the document to a device based upon the recipient's name and any rendering characteristics required by the data stream.

45. The system of claim 44, wherein the computer is at a server side.

46. The system of claim 1, wherein the computer is at a server side.

47. A system for delivering documents across a network providing an integrated solution to deliver a document to one or more different destinations or recipients, regardless of an end form which the document is presented, which system comprises:
- a document generator at a client's side and configured to selectively translate an input data stream into a data stream having an output device independent format based on selection signals, to selectively output a data stream in a device specific format or the device independent format based on the selection signals, and to embed additional data into the data stream indicative of at least two disparate desired output presentations, selected from hard copy print job, fax, archival and email;
- a computer configured to receive the data stream from the document generator programmed to analyze the data stream to determine a best output device by comparing any features required by the data stream with features of any output devices available to the computer; and
- the computer further being programmed to translate the data stream into a device specific data stream for the best output device and to transmit the device specific data stream to the best output device.

48. The system of claim 47 wherein the document generator is further configured to embed data into the data stream indicative of a job ticket containing information including rendering characteristics for a generated document and at least one task.

49. The system of claim 48 wherein the computer is further programmed to determine a best output device based upon an affinity value for each output device and whether a particular output device is capable of producing what the data stream requires.

50. The system of claim 49 wherein the output device includes a plurality of commonly capable output devices and the computer is programmed to transmit at least a portion of the data stream to each of the commonly capable output devices.

51. The system of claim 50 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

52. The system of claim 51 wherein the output device includes a plurality of commonly capable output devices and the computer is programmed to transmit the data stream to each of the commonly capable output devices to distribute production of multiple copies of a document out across the commonly capable output devices.

53. The system of claim 52 wherein embedded data includes multiple tasks and each of the tasks is destined for a different output device.

54. The system of claim 53 further comprising an output device which is a separate system for delivering documents across a network.

55. The system of claim 54 wherein the document generator is configured to embed the name of a recipient for a document as opposed to specific device information; and wherein the computer is configured and programmed to deliver the document to a device based upon the recipient's name and any rendering characteristics required by the data stream.

56. The system of claim 55, wherein the computer is at a server side.

57. The system of claim 47 wherein the computer is further programmed to determine a best output device based upon an affinity value for each output device and whether a particular output device is capable of producing what the data stream requires.

58. The system of claim 57 wherein the output device includes a plurality of commonly capable output devices and the computer is programmed to transmit at least a portion of the data stream to each of the commonly capable output devices.

59. The system of claim 58 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

60. The system of claim 59 wherein the output device includes a plurality of commonly capable output devices and the computer is programmed to transmit the data stream to each of the commonly capable output devices to distribute production of multiple copies of a document out across the commonly capable output devices.

61. The system of claim 60 wherein embedded data includes multiple tasks and each of the tasks is destined for a different output device.

62. The system of claim 61 further comprising an output device which is a separate system for delivering documents across a network.

63. The system of claim 62 wherein the document generator is configured to embed the name of a recipient for a document as opposed to specific device information; and wherein the computer is configured and programmed to deliver the document to a device based upon the recipients name and any rendering characteristics required by the data stream.

64. The system of claim 63, wherein the computer is at a server side.

65. The system of claim 47 wherein the output device includes a plurality of commonly capable output devices and the computer is programmed to transmit at least a portion of the data stream to each of the commonly capable output devices.

66. The system of claim 65 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

67. The system of claim 66 wherein the output device includes a plurality of commonly capable output devices and the computer is programmed to transmit the data stream to each of the commonly capable output devices to distribute production of multiple copies of a document out across the commonly capable output devices.

68. The system of claim 67 wherein embedded data includes multiple tasks and each of the tasks is destined for a different output device.

69. The system of claim 68 further comprising an output device which is a separate system for delivering documents across a network.

70. The system of claim 69 wherein the document generator is configured to embed the name of a recipient for a document as opposed to specific device information; and wherein the computer is configured and programmed to deliver the document to a device based upon the recipient's name and any rendering characteristics required by the data stream.

71. The system of claim 70, wherein the computer is at a server side.

72. The system of claim 47 wherein the computer is programmed to assign, for every data stream, an affinity value to each output device; compare each available output device based upon each of the output devices abilities and any rendering characteristics required by a particular data stream; and to transmit the data stream to an output device which has a highest affinity value.

73. The system of claim 72 wherein the output device includes a plurality of commonly capable output devices and the computer is programmed to transmit the data stream to each of the commonly capable output devices to distribute production of multiple copies of a document out across the commonly capable output devices.

74. The system of claim 73 wherein embedded data includes multiple tasks and each of the tasks is destined for a different output device.

75. The system of claim 74 further comprising an output device which is a separate system for delivering documents across a network.

76. The system of claim 75 wherein the document generator is configured to embed the name of a recipient for a document as opposed to specific device information; and wherein the computer is configured and programmed to deliver the document to a device based upon the recipient's name and any rendering characteristics required by the data stream.

77. The system of claim 76, wherein the computer is at a server side.

78. The system of claim 47 wherein the output device includes a plurality of commonly capable output devices and the computer is programmed to transmit the data stream to each of the commonly capable output devices to distribute production of multiple copies of a document out across the commonly capable output devices.

79. The system of claim 78 wherein embedded data includes multiple tasks and each of the tasks is destined for a different output device.

80. The system of claim 79 further comprising an output device which is a separate system for delivering documents across a network.

81. The system of claim 80 wherein the document generator is configured to embed the name of a recipient for a document as opposed to specific device information; and wherein the computer is configured and programmed to deliver the document to a device based upon the recipient's name and any rendering characteristics required by the data stream.

82. The system of claim 81, wherein the computer is at a server side.

83. The system of claim 47 wherein embedded data includes multiple tasks and each of the tasks is destined for a different output device.

84. The system of claim 83 further comprising an output device which is a separate system for delivering documents across a network.

85. The system of claim 84 wherein the document generator is configured to embed the name of a recipient for a document as opposed to specific device information; and wherein the computer is configured and programmed to deliver the document to a device based upon the recipient's name and any rendering characteristics required by the data stream.

86. The system of claim 85, wherein the computer is at a server side.

87. The system of claim 47 further comprising an output device which is a separate system for delivering documents across a network.

88. The system of claim 87 wherein the document generator is configured to embed the name of a recipient for a document as opposed to specific device information; and wherein the computer is configured and programmed to deliver the document to a device based upon the recipient's name and any rendering characteristics required by the data stream.

89. The system of claim 88, wherein the computer is at a server side.

90. The system of claim 47 wherein the document generator is configured to embed the name of a recipient for a document as opposed to specific device information; and wherein the computer is configured and programmed to deliver the document to a device based upon the recipient's name and any rendering characteristics required by the data stream.

91. The system of claim 90, wherein the computer is at a server side.

92. The system of claim 47, wherein the computer is at a server side.

* * * * *